(12) United States Patent
Helma et al.

(10) Patent No.: US 7,870,824 B2
(45) Date of Patent: Jan. 18, 2011

(54) SINGLE-PASS DOUBLE-SIDED IMAGE TRANSFER PROCESS AND SYSTEM

(75) Inventors: Thomas Richard Helma, Wakefield, RI (US); Terrence K. Jones, Jamestown, RI (US); Raymond Eugene Maynard, Westerly, RI (US); Richard Michael Sadeck, Westport, MA (US)

(73) Assignee: ZIH Corp., Hamilton (BM)

( * ) Notice: Subject to any disclaimer, the term of this patent is extended or adjusted under 35 U.S.C. 154(b) by 449 days.

(21) Appl. No.: 11/406,548

(22) Filed: Apr. 19, 2006

(65) Prior Publication Data

US 2007/0099462 A1    May 3, 2007

Related U.S. Application Data

(60) Provisional application No. 60/673,203, filed on Apr. 20, 2005.

(51) Int. Cl.
*B41J 3/60* (2006.01)
*B41J 13/12* (2006.01)

(52) U.S. Cl. .............................. 101/485; 101/33; 101/34

(58) Field of Classification Search .................. 101/33, 101/34, 485; 198/347.2; 400/521; *B41J 3/60, B41J 13/12*
See application file for complete search history.

(56) References Cited

U.S. PATENT DOCUMENTS

| | | | |
|---|---|---|---|
| 4,384,711 A | 5/1983 | Gabel et al. | |
| 4,519,600 A | 5/1985 | Warwick et al. | |
| 4,659,927 A | 4/1987 | Tago et al. | |
| 4,921,237 A | 5/1990 | Nubson et al. | |
| 5,009,411 A | 4/1991 | Manderfeld et al. | |
| 5,015,834 A | 5/1991 | Suzuki et al. | |
| 5,080,512 A | 1/1992 | Schofield et al. | |
| 5,111,239 A | 5/1992 | Kamimura et al. | |
| 5,277,501 A | 1/1994 | Tanaka et al. | |
| 5,299,796 A | 4/1994 | Wooldridge | |
| 5,342,132 A | 8/1994 | Tanaka et al. | |
| 5,344,808 A | 9/1994 | Watanabe et al. | |
| 5,532,724 A | 7/1996 | Inagaki et al. | |
| 5,768,143 A * | 6/1998 | Fujimoto | 700/235 |

(Continued)

FOREIGN PATENT DOCUMENTS

DE    195 43 099 A1    5/1997

(Continued)

OTHER PUBLICATIONS

International Search Report for corresponding International Appl. No. PCT/US2010/020409, mailed Aug. 4, 2010.

*Primary Examiner*—Judy Nguyen
*Assistant Examiner*—Jennifer Simmons
(74) *Attorney, Agent, or Firm*—Alston & Bird LLP

(57) ABSTRACT

The present disclosure is directed to a printing assembly incorporating an improved double-sided image transfer station. The present disclosure also describes a product processing apparatus including a cross feed processing architecture. The single-pass double-sided image transfer station and cross feed processing architectures described herein provide numerous advantages over prior art product processing devices. In particular, the single-pass double-sided image transfer station provides for reduced print times, less shuttling of the product during printing, and a less complex, therefore, more reliable printing operation overall. The cross feed architecture provides an efficient processing path for the product through the device and facilitates processing modularization.

48 Claims, 17 Drawing Sheets

U.S. PATENT DOCUMENTS

| | | | |
|---|---|---|---|
| 5,806,999 | A | 9/1998 | Kobayashi |
| 5,807,461 | A | 9/1998 | Hagstrom |
| 5,814,796 | A * | 9/1998 | Benson et al. ............... 235/375 |
| 5,821,976 | A | 10/1998 | Inagaki et al. |
| 5,956,067 | A | 9/1999 | Isono et al. |
| 6,039,480 | A | 3/2000 | Andoh et al. |
| 6,206,589 | B1 | 3/2001 | Bjork et al. |
| 6,236,420 | B1 | 5/2001 | Matsuzaka |
| 6,261,012 | B1 | 7/2001 | Haas et al. |
| 6,308,886 | B1 | 10/2001 | Benson et al. |
| 6,315,283 | B1 | 11/2001 | Haas et al. |
| 6,352,206 | B1 * | 3/2002 | Ashley et al. ............... 235/475 |
| 6,377,291 | B2 | 4/2002 | Andoh et al. |
| 6,384,854 | B1 | 5/2002 | Ibs et al. |
| 6,386,772 | B1 | 5/2002 | Klinefelter et al. |
| RE37,726 | E | 6/2002 | Tanaka et al. |
| 6,406,935 | B2 | 6/2002 | Kayanakis et al. |
| 6,409,872 | B1 | 6/2002 | Campion et al. |
| 6,431,537 | B1 | 8/2002 | Meier |
| 6,431,540 | B1 | 8/2002 | Lien et al. |
| 6,446,832 | B1 | 9/2002 | Holec et al. |
| 6,457,886 | B1 | 10/2002 | Meier |
| 6,468,379 | B1 | 10/2002 | Naito et al. |
| 6,513,806 | B2 | 2/2003 | Yui |
| 6,536,758 | B2 | 3/2003 | Meier et al. |
| 6,543,507 | B2 | 4/2003 | Lien |
| 6,554,044 | B2 | 4/2003 | Paulson et al. |
| 6,567,112 | B2 | 5/2003 | Suzuki |
| 6,587,135 | B1 | 7/2003 | Suzuki et al. |
| 6,612,571 | B2 * | 9/2003 | Rider ...................... 271/279 |
| RE38,295 | E | 11/2003 | Kobayashi et al. |
| 6,648,526 | B2 | 11/2003 | Kobayashi et al. |
| 6,664,993 | B2 | 12/2003 | Isono |
| 6,668,716 | B2 | 12/2003 | Tsuruta et al. |
| 6,679,637 | B2 | 1/2004 | Tsuruta et al. |
| 6,693,655 | B2 | 2/2004 | Fujimoto et al. |
| 6,694,884 | B2 | 2/2004 | Klinefelter et al. |
| 6,714,227 | B2 | 3/2004 | Honma et al. |
| 6,758,470 | B1 | 7/2004 | Meier et al. |
| 6,758,616 | B2 | 7/2004 | Pribula et al. |
| 6,762,780 | B2 | 7/2004 | Tsuruta et al. |
| 6,781,615 | B2 | 8/2004 | Tsuruta |
| 6,796,732 | B2 | 9/2004 | Kobayashi et al. |
| 6,830,392 | B2 | 12/2004 | Kobayashi et al. |
| 6,830,803 | B2 | 12/2004 | Vaidya et al. |
| 6,832,866 | B2 | 12/2004 | Klinefelter et al. |
| 6,873,348 | B1 | 3/2005 | Isono et al. |
| 6,880,991 | B2 | 4/2005 | Tsuruta et al. |
| 6,894,710 | B2 | 5/2005 | Suzuki et al. |
| 6,932,527 | B2 | 8/2005 | Pribula et al. |
| 6,945,524 | B2 | 9/2005 | Meier et al. |
| 6,953,154 | B2 | 10/2005 | Suzuki et al. |
| 6,963,351 | B2 | 11/2005 | Squires et al. |
| 6,979,141 | B2 | 12/2005 | Karst et al. |
| 7,018,117 | B2 | 3/2006 | Meier et al. |
| 7,037,013 | B2 | 5/2006 | Klinefelter et al. |
| 7,119,823 | B2 | 10/2006 | Takahashi et al. |
| 7,147,165 | B2 | 12/2006 | Mongin et al. |
| 7,173,643 | B2 | 2/2007 | Kubota et al. |
| 7,183,505 | B2 | 2/2007 | Mongin et al. |
| 7,237,485 | B2 | 7/2007 | Meier et al. |
| 2002/0178939 | A1 | 12/2002 | Tsuruta et al. |
| 2003/0216826 | A1 | 11/2003 | Klinefelter et al. |
| 2004/0108385 | A1 | 6/2004 | Suzuki et al. |
| 2004/0109715 | A1 | 6/2004 | Meier et al. |
| 2004/0146329 | A1 | 7/2004 | Klinefelter |
| 2004/0164169 | A1 * | 8/2004 | Suzuki et al. ............... 235/488 |
| 2005/0104281 | A1 | 5/2005 | Stender et al. |
| 2005/0140769 | A1 | 6/2005 | Kanemaru et al. |
| 2005/0275708 | A1 | 12/2005 | Squires et al. |
| 2006/0065718 | A1 | 3/2006 | Tsuruta |
| 2006/0123471 | A1 | 6/2006 | Fontanella et al. |
| 2006/0151935 | A1 | 7/2006 | Liatard et al. |
| 2006/0204308 | A1 | 9/2006 | Meier et al. |
| 2007/0056027 | A1 | 3/2007 | Nehowig et al. |
| 2007/0057057 | A1 | 3/2007 | Andresky et al. |
| 2007/0065187 | A1 | 3/2007 | Kodera et al. |
| 2007/0102104 | A1 | 5/2007 | Galles et al. |

FOREIGN PATENT DOCUMENTS

| | | |
|---|---|---|
| EP | 1 371 493 A2 | 12/2003 |
| JP | 1988173693 | 7/1988 |
| JP | 1989044795 | 2/1989 |
| JP | 1989058590 | 3/1989 |
| JP | 1991-105919 | 11/1991 |
| JP | 1993254261 | 10/1993 |
| JP | 1993297601 | 11/1993 |
| JP | 1993330251 | 12/1993 |
| JP | 08 058125 A | 3/1996 |
| JP | 1999309998 | 11/1999 |
| JP | 2000071410 | 3/2000 |
| JP | 2000238439 | 9/2000 |
| JP | 2001-331043 A | 11/2001 |
| JP | 2002052678 | 2/2002 |
| JP | 2002086936 | 3/2002 |
| JP | 2002187370 | 7/2002 |
| JP | 2002205471 | 7/2002 |
| JP | 2002274060 | 9/2002 |
| JP | 2002307845 | 10/2002 |
| JP | 2002347355 | 12/2002 |
| JP | 2002362068 | 12/2002 |
| JP | 2003025745 | 1/2003 |
| JP | 2003159879 | 6/2003 |
| JP | 2003165275 | 6/2003 |
| JP | 2003182251 | 7/2003 |
| JP | 2006-321069 A | 11/2006 |
| WO | WO 99/55530 A1 | 11/1999 |
| WO | WO 00/27634 A1 | 5/2000 |

* cited by examiner

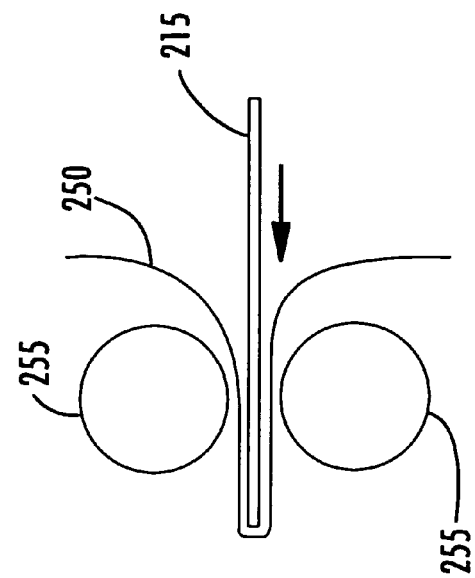
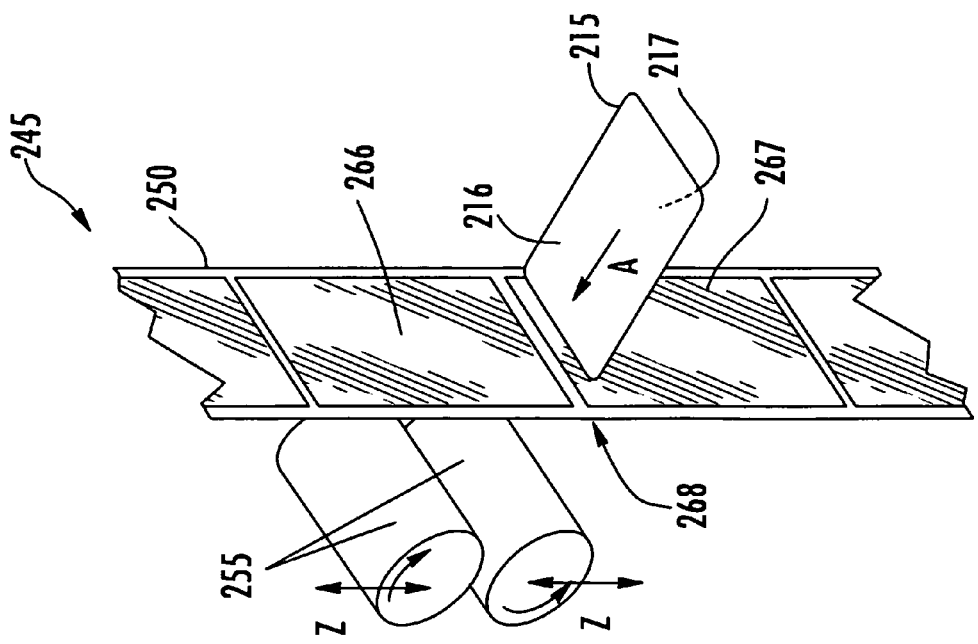

SINGLE-PASS DOUBLE-SIDED IMAGE TRANSFER PROCESS AND SYSTEM

CROSS-REFERENCE TO RELATED APPLICATIONS

The present application claims priority to U.S. Provisional Application. No. 60/673,203 filed Apr. 20, 2005; the contents of which are incorporated herein in their entirety.

BACKGROUND OF THE INVENTION

1. Field of the Invention

The present invention is directed to a method, device, and system for transferring images to both sides of media cards or other products, and more particularly to a single-pass double-sided image transfer system that may find beneficial use in printing cards and other media.

2. Description of the Related Art

FIG. 1 depicts a long edge leading double-sided printer in accordance with the known prior art. The printer is structured to print rectangular media cards such as PVC media cards that are commonly known in the art. The phrase "long edge leading" refers to the primary orientation taken by media cards as they are manipulated through the printer during printing operations. In a long edge leading ("LEL") orientation the long edges of the rectangular media card are oriented generally perpendicular to the media card's direction of movement. Alternatively, in a short edge leading orientation ("SEL") the short edges of the rectangular media card are oriented generally perpendicular to the media card's direction of movement. The path of the media card through the printer depicted in FIG. 1 has been defined along X and Y axes for illustration purposes.

LEL card printers in general have the advantage, relative to their SEL counterparts, of faster printing. This is because it takes less time to transition from edge to edge LEL vs. SEL. However, LEL printers of the type illustrated in FIG. 1 have at least two undesirable design characteristics that result in relatively slow and inefficient printing or media card conversion operations. The first such characteristic is referred to herein as a paused LEL card encoding technique. The second such characteristic is referred to as a multi-pass double sided print operation. Each of these design characteristics are described below.

The depicted LEL double-sided printer 10 includes a card feeder 20 for storing a plurality of media cards 15, a flip station 25, an encoding station 30, a print station 35, and transfer station 40. During printing operations, a media card 15 is drawn from the card feeder 20 long edge first as shown. The media card 15 is drawn upwardly to the flip station 25 in a Y direction along arrow A. The flip station 25 rotates the media card 15 to proceed long edge leading in the X direction along arrow C to the encoding station 30. Conventional media cards (e.g., credit cards, etc.) include magnetic strips disposed longitudinally along one surface of the cards. The media card is positioned in the LEL orientation upon reaching the encoder and, thus, the media card's magnetic strip is positioned transverse to the media card's direction of movement. Accordingly, to allow for proper encoding the card is paused or held in place for a period of time at the encoding station to allow a transversely aligned magnetic read/write head to translate along the media card magnetic strip. This process is referred to above as the paused LEL card encoding technique.

If encoding processes are unsuccessful, the depicted printer 10 retracts the media card 15 from the encoding station 30 along arrow D to the flip station 25. The flip station 25 transmits the unsuccessfully encoded media card to a reject port 22 along arrow E as shown. If encoding processes are successful, the media card 15 is transmitted in the X direction along arrow F for multi-pass double-sided printing operations. The phrase "multi-pass double-sided printing" refers to printing operations that include distinct steps for printing to first and second surfaces of a media card. Such multi-pass double-sided printing operations are conventionally achieved by printing to a first side of the media card, inverting the media card, and printing to a second side of the media card with a single printing head as described further below.

The depicted printer 10 includes an intermediate thermal transfer media 43 disposed between an intermediate thermal transfer media supply roll 41 and an intermediate thermal transfer media take-up roll 42. The intermediate thermal transfer media supply roll 41 dispenses (in strip form) the intermediate thermal transfer media 43 past the print station 35 where print dye is applied to the intermediate thermal transfer media 43. Further downstream, the intermediate thermal transfer media 43 extends past the transfer station 40 where portions of the intermediate thermal transfer media 43 bearing print are transferred onto the media cards 15.

The depicted printer 10 also includes a color ribbon supply roll 36, a color ribbon take-up roll 37, and a ribbon printing head 38. The color ribbon supply roll 36 supplies a color ribbon 39 that has, for example, a sequence of colorant panels including yellow (Y), magenta (M), cyan (C) and/or black (K) panels for imprinting of a range of colors or light/dark shades onto the intermediate thermal transfer media 43. The color ribbon is routed so as to be coextensive to the intermediate thermal transfer media 43 between the ribbon printing head 38 and a platen 33. The ribbon printing head 38 is then thermally engaged to impart a printed image to a portion of the intermediate thermal transfer media 43.

The printed intermediate thermal transfer media 43 is routed downstream to the transfer station 40 as shown. The transfer station 40 is comprised of a heated roller 44 that is opposed by an idler roller 47. The media card 15 is coextensively aligned with a printed portion of the intermediate thermal transfer media 43 at the transfer station 40. The heated roller 44 engages the intermediate thermal transfer media 43 to impart a printed image to a first surface of the media card 15 in a first step of the multi-pass printing operation referenced above. The media card 15 is then transmitted back, along arrows G and D, to the flip station 25. The flip station 25 performs a second step of a multi-pass printing operation by inverting the media card 15. The media card 15 is then re-transmitted along arrows C and F to the transfer station 40 for completing a third-step of the multi-pass printing operation, namely, printing the second surface of the media card 15.

As referenced above, LEL printers of the type depicted in FIG. 1 contain paused LEL card encoding and multi-pass printing techniques that cause significant print and conversion inefficiencies. For example, by pausing the media card for a period of time to allow the transversely aligned read/write head to pass over the media card magnetic strip the depicted printer takes longer to perform encoding operations than standard SEL printers that use a stationary read/write head to encode the media card as the card is moved through the printer. Further, by shuttling the card back and forth in multiple passes to print to opposed surfaces of the media card the depicted printer takes longer than would be necessary if the printer were able to perform double-sided printing operations in a single-pass.

Therefore, it would be advantageous to provide an improved printer and printing process that does not require paused LEL card encoding and further is capable of transfer printing to opposed sides of a media card in a single pass without separate printing systems on opposite sides of the media card. It would be further desirable for such a printer and printing process to include an efficient card conversion architecture that reduces the need for complex shuttling of the media card within the printer.

BRIEF DESCRIPTION OF THE SEVERAL VIEWS OF THE DRAWINGS

Reference is now made to the accompanying drawings, which are not necessarily drawn to scale, and wherein:

FIG. 3 is a schematic illustration of a single-pass double-sided image transfer station structured to efficiently impart a printed image to opposed sides of a media card in accordance with one embodiment of the invention;

FIG. 3A is a side view of the single-pass double-sided image transfer station depicted in FIG. 3;

DETAILED DESCRIPTION OF THE INVENTION

Figure 1:
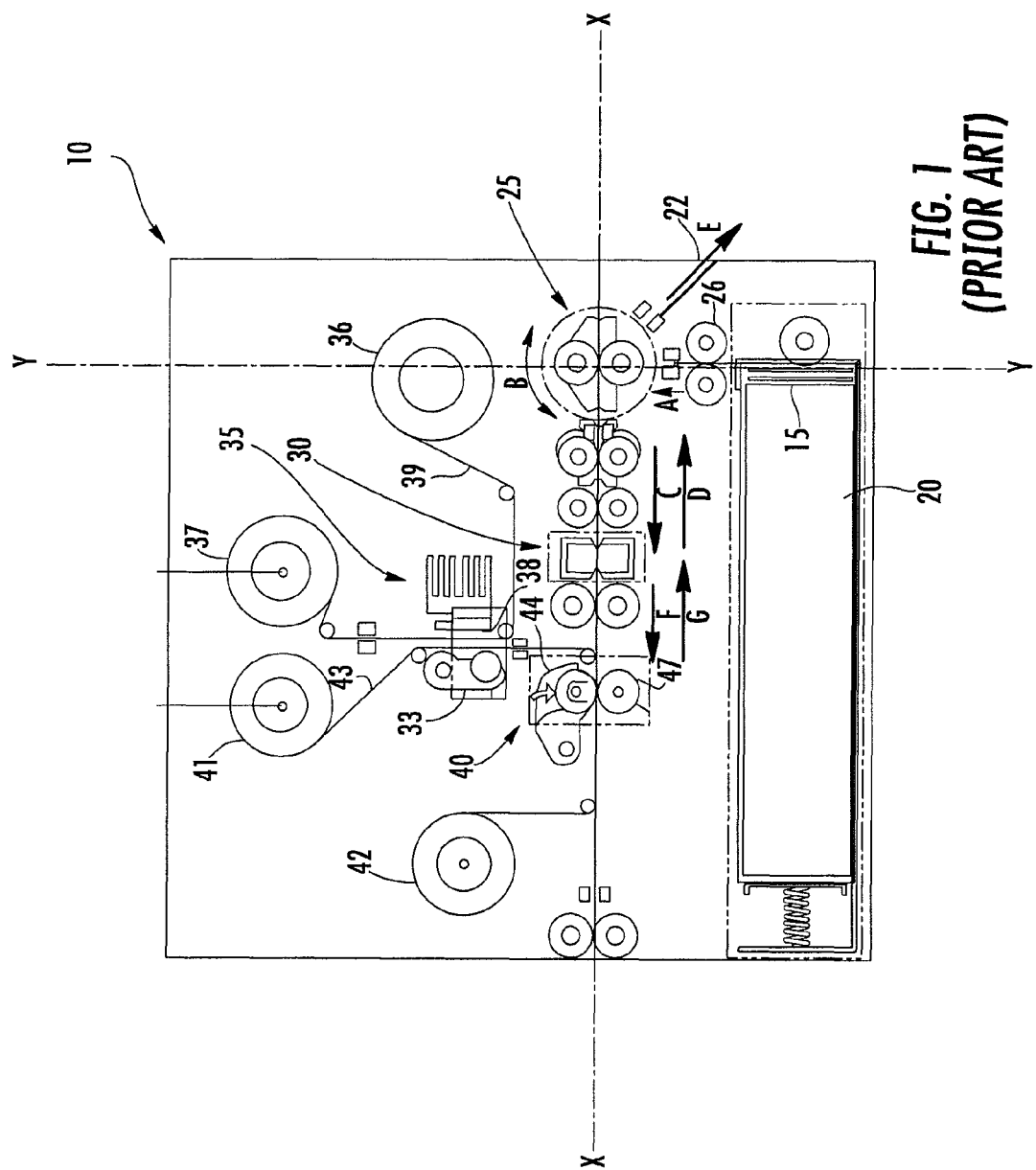
FIG. 1 is a side view of a double-sided printer incorporating a paused LEL encoding station and a multi-pass double-sided printing operation in accordance with the known prior art.

A number of executions of the present invention now will be described more fully hereinafter with reference to the accompanying drawings, in which some, but not all embodiments of the inventions are shown. Indeed, the present invention may be embodied in many different forms and should not be construed as limited to the embodiments set forth herein; rather, these embodiments are provided so that this disclosure will satisfy applicable legal requirements. Like numbers refer to like elements throughout.

The present invention addresses the above needs and achieves other advantages by providing a printing assembly incorporating an improved double-sided image transfer station as exemplified in the described embodiments. A media processing device is also disclosed herein that incorporates a cross feed media processing architecture for feeding media to the above double-sided image transfer station or other card conversion stations as described below. Such cross feed architectures are capable of increased media processing speed and efficiency as compared to the prior art. In one embodiment, a media processing device may include a printing assembly having a single-pass double-sided image transfer station that uses an intermediate transfer media to print to opposite surfaces of a printable media without requiring multiple thermal printing heads or inefficient media flipping or shuttling. In another embodiment, the media processing device may include a cross-feed architecture that facilitates media movement between first and second axes without substantial wasted or redundant motion. The double-sided image transfer stations and cross feed media processing architectures of various embodiments of the present invention may be incorporated into a single device (e.g., a printer) or may be used separately in multiple devices as will be apparent to one of ordinary skill in the art in view of the foregoing disclosure.

For illustration purposes, the foregoing specification describes double-sided image transfer stations and cross feed processing architectures that are structured to print or otherwise process media cards. It is noted however, that the present invention is not limited to use with media cards and may, in fact, incorporate double-sided image transfer stations and cross feed architectures that are structured to print or otherwise process any type of "product" including but not limited to media cards, labels, RFID tags, smart cards, printable objects, and the like. Such products may be comprised of cellulose-based materials (e.g., paper, cardboard, wood, etc.), polymers, metals, laminates, composites, films, and other similar materials.

Further, also for illustration purposes, the foregoing specification describes double-sided image transfer stations and cross feed media processing architectures that are incorporated within or used by printers. It is noted however, that the present inventions are not limited to use within printers and may, in fact, embody double-sided image transfer stations and cross feed media architectures that are used within a variety of media processing devices including but not limited to card printers, label printers, desk top printers, laminators, RFID readers, encoders, or other similar media processing assemblies.

In one embodiment, the present invention includes a printer that is capable of transferring images simultaneously to opposed surfaces of a media card. More particularly, the printer includes printing assembly having a single-pass double-sided image transfer station for transferring images to first and second surfaces of the media card. Whereas the printer may employ any of a variety of print modalities, by way of example, the present embodiment includes a print station structured to print to an image to an intermediate transfer media, such as the intermediate thermal transfer media ("IT media") described in detail below. The intermediate transfer media is then routed to the single-pass double-sided image transfer station where the printed image is imparted to opposite sides of the media card. A transfer device is provided at the image transfer station for simultaneously heating and compressing the intermediate thermal transfer media against the first and second surfaces of the media cards and, thereby, imparting the printed image thereon. In one embodiment, the transfer device is comprised of opposed thermal compression rollers. Alternatively, the transfer device may be comprised of arcuate platens defining opposed arcuate surfaces, reciprocating clamps, or other similar devices as will be apparent in view of the disclosure provided below.

In another embodiment, the present invention includes a printer having a cross feed architecture for feeding printable media to a single-pass double-sided image transfer station or other media processing stations. The cross feed architecture comprises a first card processing axis and a second card processing axis. The first and second card processing axes define a processing plane. A cross feed station is provided for efficiently transferring a media card along the first card processing axis to the second card processing axis within the card processing plane. In another embodiment, at least one card processing station is disposed along the first card processing axis. In another embodiment, at least one card processing station is disposed along the second card processing axis. In yet another embodiment, an encoding station is disposed proximate the cross feed station.

Turning now to a description of FIGS. 2-13, various embodiments of the present invention are directed to media processing devices that include printing assemblies having a single-pass double-sided image transfer station. As used herein, the term "single-pass double-sided image transfer station" refers to a thermal image transfer assembly that is capable of printing to opposite surfaces of a printable media in a single pass. Additional embodiments of the present invention are directed to media processing devices that include cross feed media processing architectures that quickly and efficiently maneuver printable media along a processing path.

The single-pass double-sided image transfer stations and cross feed media processing architectures provide numerous advantages over prior art media processing devices. In particular, the single-pass double-sided image transfer station provides for reduced print times, less shuttling of the media during printing, and a less complex, therefore, more reliable printing operation overall. The cross feed architecture provides an efficient processing path for the media through the device and facilitates media processing modularization. The cross feed architecture further eliminates inefficient media conversion processes attributable to conventional LEL printing such as the paused LEL card encoding process described above. These and other advantages will be apparent to one of ordinary skill in the art in view of the foregoing discussion. Notably, single-pass double-sided image transfer stations are generally described in reference to FIGS. 2-9, while cross feed architectures are generally described in reference to FIGS. 9-12.

Media cards 115 refer generally to semi-rigid printable cards that are commonly used as identification cards, smart cards, credit cards, highway toll cards, and the like. The precise size, shape, and composition of the media cards 115 may change between applications. For example, rectangular, CR-80 sized cards fabricated from poly-vinyl chloride ("PVC") or composite structures of PVC and polyester may be used. As referenced above, although the foregoing specification illustrates various embodiments of the present invention by describing assemblies and structures for printing or otherwise processing media cards, the present invention is not limited in this regard. Various embodiments of the present invention are equally applicable to printing or otherwise processing various other types of printable media.

Figure 2:
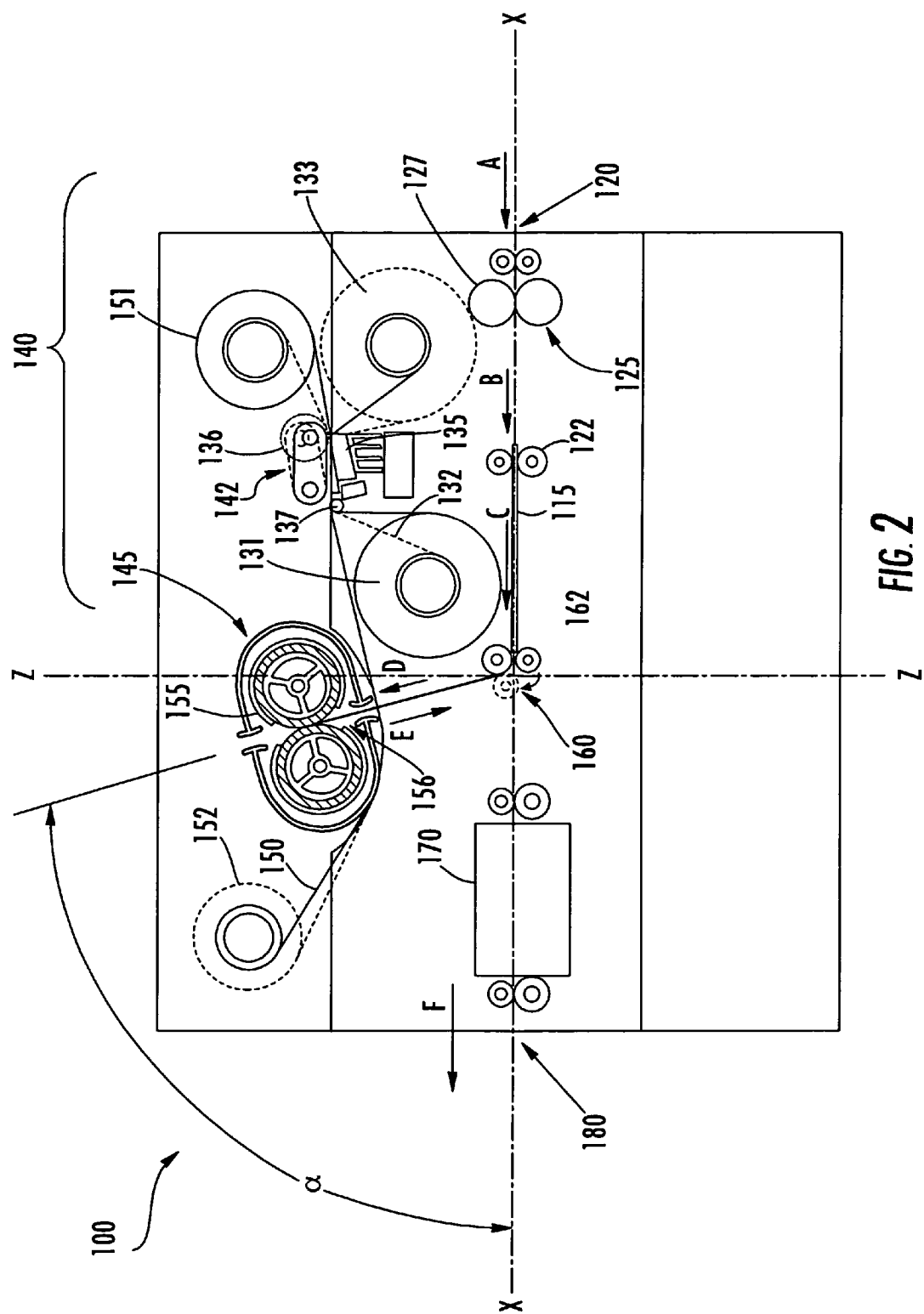
FIG. 2 is a printer incorporating a single-pass double-sided image transfer station in accordance with one embodiment of the invention.

FIG. 2 depicts a printer having a printing assembly 140 comprising a print station 142 and a single-pass double-sided image transfer station 145. The printing assembly 140 is capable of single-pass double-sided image formation operations in accordance with various embodiments of the present invention. The depicted printer is structured to form images on opposed sides of media cards. The media cards 115 are inserted into a card feed port 120 in a LEL orientation as shown. In other embodiments, the media cards 115 may be inserted in a SEL orientation. The media cards 115 may be inserted manually by a user or automatically by a card feeder (not shown). In the depicted embodiment, a media card 115 is inserted and then transferred from the card feed port 120 in the X direction along arrow A to an optional card cleaning station 125. In the depicted embodiment, the cleaning station 125 includes opposed cleaning rollers 127, which are commonly known in the art. The media card 115 is drawn through the cleaning rollers 127 and fed to a pair of transport rollers 122 along arrow B. The media card 115 is then fed to a deflector 160 as shown. Various known deflectors may be used to deflect media cards from a first path to a selected second path. Here, the deflector 160 comprises first and second rollers 161, 162 wherein the second roller 162 is rotatable about the first roller 161 to direct the media card upwardly along an angle α to the single-pass double-sided image transfer station 145.

Figure 2B:
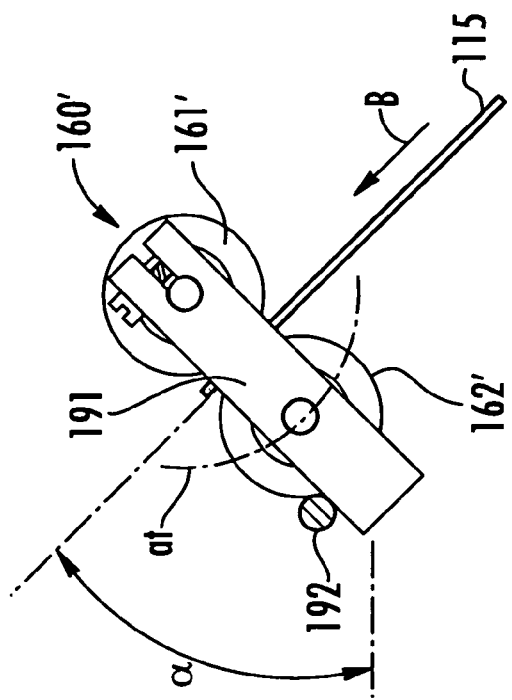
FIG. 2B is a detail view of the deflector illustrated in FIG. 2A, wherein the second roller of the deflector is disposed in a second position.
Figure 2A:
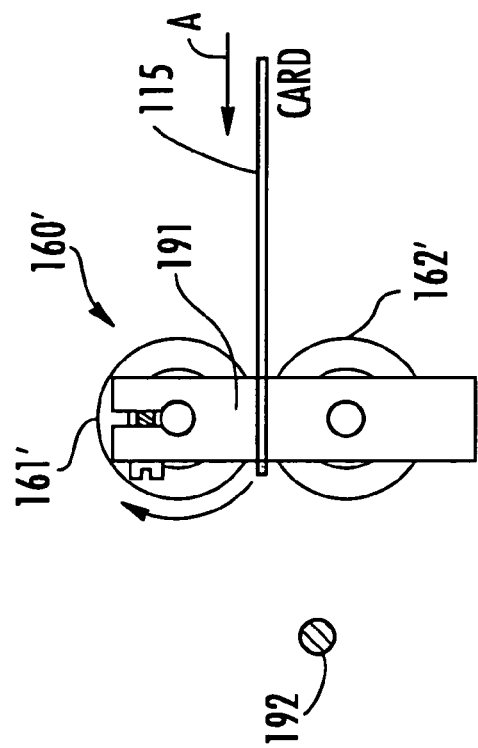
FIG. 2A is a detail view of a deflector structured in accordance with one embodiment of the invention, wherein the deflector comprises a second roller disposed in a first position.

FIGS. 2A and 2B are a detail view of an exemplary deflector structured in accordance with yet another embodiment of the present invention. The depicted deflector 160' comprises a first roller 161', a second roller 162', and a support arm 191 as shown. In a first position, as illustrated in FIG. 2A, the first and second rollers 161', 162' define a nip structured to receive a product 115 entering from a first direction along arrow A as shown. In one embodiment, the support arm 191 is adapted to support the second roller 162' for movement about the first roller 161' to a second position as shown in FIG. 2B. The first and second positions are defined along an imaginary axis of travel AT disposed about the first roller 161' as shown. In the second position, the nip defined between the first and second rollers 161', 162' is structured to transmit the product in a second direction along arrow B as shown. In the depicted embodiment, the second direction is offset relative to the first direction by an angle α. In various embodiments, the support arm or other similar structure may contact a stop 192 to define the offset angle α as shown. In other embodiments, such a stop 192 may not be needed.

For purposes of the foregoing specification and appended claims, the term "station" refers to a media processing position where one or more media processing or conversion operations occur. Such media processing operations may include image transfer, printing, cleaning, encoding, voiding, laminating, magnetic read/write operations, radio frequency read/write operations, test operations, and the like.

In the embodiment of FIG. 2, the printer 100 includes a printing assembly 140 that is structured to impart printed images (e.g., text, graphics, etc.) to opposite surfaces of the media card 115 when the card is positioned at the single-pass double-sided image transfer station 145. The depicted printing assembly 140 includes an intermediate transfer media 150 ("IT media") disposed between an IT media supply roll 151 and an IT media take-up roll 152. The IT media supply roll 151 dispenses (in strip form) the IT media 150 past a print station 142 where print is applied to the IT media 150. Further downstream, the IT media 150 extends past the single-pass double-sided image transfer station 145 where portions of the IT media 150 bearing print are transferred onto media cards 115.

Figure 2C:
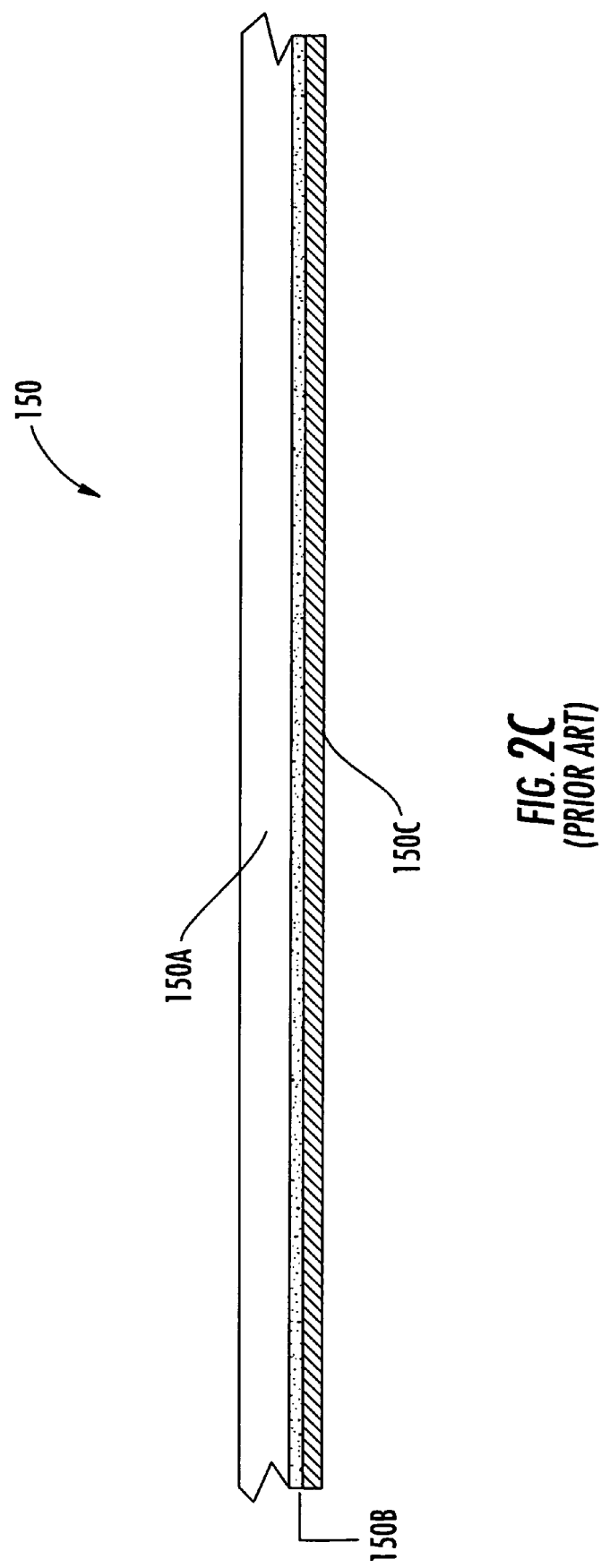
FIG. 2C is a side schematic illustration of an intermediate transfer media structured in accordance with the known prior art.

Several types of IT media 150 that are currently known in the art may be used to facilitate printing according to various embodiments of the present invention. For example, one conventional IT media is depicted in FIG. 2C. The conventional IT media 150 includes a carrier film 150A for supporting a release liner 150B and a print receiving surface 150C. Images (e.g., graphics, text, etc.) are printed or otherwise formed on the print receiving surface 150C and the release layer 150B may be thermally activatable for releasing the print receiving surface 150C. Non-thermally activated media and media supporting laminate patches may be provided in addition to, or instead of, the printed images noted above. In this regard, the IT media 150 facilitates transfer of the printed indicia to a media card or other printable media as will be apparent to one of ordinary skill in the art. In one relatively more specialized embodiment, the IT media may be the intermediate thermal transfer media described in commonly owned U.S. Provisional Patent Application Ser. No. 60/642,012 entitled "Thermal Transfer Media with Protective Patch and Adhering Receptive Layer and Method of Using the Same," which is hereby incorporated by reference in its entirety.

As shown in FIG. 2, the IT media supply roll 151 typically includes a rolled strip of IT media 150 wound on a supporting core. The core is rotatably supported to play out the strip of IT media 150 in response to tension from a positively driven IT take-up roll 152. The IT media supply roll 151 may also be motivated to allow back-and-forth movement of IT media 150, to allow printing of various superimposed images (perhaps of varying colors) onto the IT media 150. In its complete path, the IT media 150 extends off of the IT media supply roll 151, through the print station 142, past the single-pass double-sided image transfer station 145, and onto the IT media take-up roll 152. It should be noted, however, that the storage, path of travel, and motivation of the IT media 150 could be varied. For example, the IT media could define discrete sections, instead of a strip, and may be dispensed from a cartridge through the print station 142 and the single-pass double-sided image transfer station 145.

The print station 142 could employ ink jet or various other printing technologies. In the depicted embodiment, the print station 142 includes a color ribbon supply roll 131, a color ribbon take-up roll 133, a thermal printing head 135, and a platen 136. The color ribbon supply roll 131 supplies a color ribbon 132 that has, for example, a sequence of colorant panels including yellow (Y), magenta (M), cyan (C) and/or black (K) panels for imprinting of a range of colors or light/dark shades onto the IT media 150 by the thermal printing head 135. Typically, this is referred to as a dye sublimation technique for the Y, M and C panels, and/or mass transfer printing for the K panel. Of course, it should be noted that other printing techniques could be employed as long as they are compatible with printing on IT media 150.

The color ribbon 132 extends off of the color ribbon supply roll 131, adjacent and coextensive with the IT media 150, between the thermal printing head 135 and the platen 136 and onto the color ribbon take-up roll 133. In one embodiment, one or more idlers 137 may be disposed on either side of the thermal printing head 135 for enlarging the coextensive area of the color ribbon and IT media 150 as known in the art. The color ribbon take-up roll 133 is preferably motivated to advance the color ribbon 132 during multiple printing passes and heating of the thermal printing head 135 to impart an image to the IT media 150 before it is advanced to the single-pass double-sided image transfer station 145.

In the depicted embodiment, the single-pass double-sided image transfer station 145 includes a pair of thermal compression rollers 155. The thermal compression rollers may be heated by conductive films, foils, or silicone pads, disposed on the surface of the rollers. In other embodiments, the thermal compression rollers 155 may be heated internally by a radiant thermal core or by a stationary internal heated cartridge in intimate contact with an outer surface of the rollers (not shown). The compression rollers 155 are urged against and thus compress opposing surfaces of the media card 115 as the card 115 is fed between the rollers 155 to an image transfer position shown in greater detail by FIGS. 3 and 4.

Once a printed image has been imparted to the media card 115, the media card 115 is retracted to the deflector 160 along arrow E as shown. In one embodiment, the IT media supply and IT media take-up rolls 151, 152 are reverse biased during the retraction process to ensure that loosely hanging IT media 150 does not disturb the freshly printed media card image. Such reverse-biasing also assists card retraction by applying a tension force to the trailing edge of the media card as it leaves the transfer station 145. In the depicted embodiment, card retraction is further enhanced by gravity as the media card 115 is retracted downwardly (i.e., in the Z direction along arrow E) as shown.

Media cards or other printable media may include a programmable memory such as a magnetic strip or an RFID chip (not shown). In the depicted embodiment, the media card 115 is returned by the deflector 160 to proceed along the X direction to an encoding station 170. The encoding station 170 includes a programming head (not shown) for reading, writing to, or otherwise programming the programmable memory of the media card 115. In one embodiment, the media card 115 is transmitted from the encoding station 170 in the X direction along arrow F to a media card exit port 180 as shown. In another embodiment, the media card 115 may be transmitted from the encoding station 170 to subsequent card processing operations (not shown) that may be apparent to one of ordinary skill in the art.

FIG. 3 is a detail schematic illustration of a single-pass double-sided image transfer station 245 for practicing a single-pass double-sided image transfer operations in accordance with one embodiment of the invention. The single-pass double-sided image transfer station 245 uses a thermal transfer process adapted to form an image on at least one surface of a media card or other ink-receptive media. Generally, the thermal transfer process comprises the steps of: transporting an image-supporting web (e.g., IT media, color ribbon, monochrome ribbon, etc.) having first and second surfaces to a single-pass double-sided image transfer station, moving an image-receptive media having first and second surfaces into the image-supporting web such that the first surface of the image-supporting web is coextensive with at least a portion of the first and second surfaces of the image-receptive media, and transferring the image from the image-supporting web to at least one of the first and second surfaces of the image-receptive media.

In the depicted embodiment, the image-receptive media is a media card 215 having blank opposed first and second surfaces 216, 217 and the image-supporting web is an IT media 250. The media card 215 approaches the IT media 250 in a SEL orientation as shown. The IT media 250 includes first and second printed panels 266, 267 that are spaced serially along the IT media 250 as shown. The printed panels 266, 267 may be formed at upstream print stations similar to those discussed above or may be pre-printed and simply played out from a pre-printed media spool (not shown). The printed panels 266, 267 may include monochrome images and/or multicolor images. Finally, the printed panels 266, 267 may be generally continuous as shown or may include multiple discrete images of identical or differing colors.

In the depicted embodiment, a media card 215 is fed along arrow A to contact the IT media 250 generally adjacent registration mark 268 as shown. Such registration marks may be optically sensed to facilitate this alignment as will be apparent to one of ordinary skill in the art. As the media card 215 contacts the IT media 250, the leading edge of the media card 215 folds the IT media 250 such that the first printed panel 266 is disposed adjacent the first blank surface 216 of the media card 250 and the second printed panel 267 is disposed adjacent the second blank surface 217 of the media card 250 as shown in FIG. 3A. Heated thermal compression rollers 255 are urged against and, thus, compress opposing surfaces of the media card 215 as the card 215 is fed between the rollers 255. The depicted thermal compression rollers 255 may be heated by conductive films, foils, or silicone pads that are disposed on the surface of the rollers or by internal devices as referenced above. Other image transfer devices may be used as described in further detail below.

Although various embodiments of the present invention are capable of transferring images to opposed sides of a printable media in a single pass, it is noted that it may be desirable from time to time to transfer images to only one side of the media per pass. For example, in one embodiment a single thermal compression roller may be heated each time the media card and IT media are fed between the thermal compression rollers. Accordingly, ink from only one of the above-referenced printed panels is thermally transferred to the media card per transfer pass. A second transfer pass may then be provided wherein the other thermal compression roller is heated and the media card and IT media are once again fed between the thermal compression rollers. In an alternate single-sided image transfer embodiment, the IT media may include an unprinted gap (not shown) between printed panels such that the unprinted gap is provided adjacent one surface of the media card while a printed panel is provided adjacent the opposite surface of the media card. Compression between thermal rollers or other transfer devices would thus result in image transfer to only one surface of the media card.

Figure 3B:
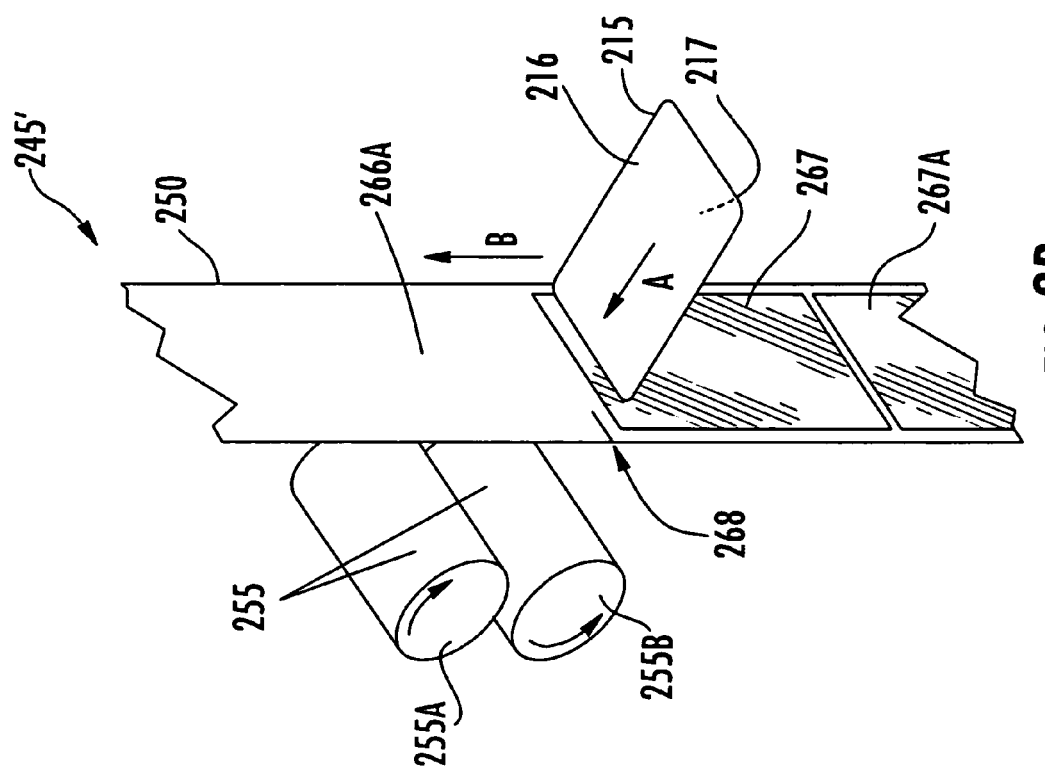
FIG. 3B is a schematic illustration of a single-pass double-sided image transfer station structured to impart a printed image to a single side of a media card in accordance with one embodiment of the invention.

In another embodiment, as shown in FIG. 3B, a single-pass double-sided transfer assembly 245' may be provided comprising multiple image panels 267, 267A, etc., which are adapted for respective transfer to second surfaces 217 of a series of media cards (only the first media card 215 of this series is shown). The image panels 267, 267A may be printed consecutively to the IT media 250 as shown. In such embodiments, the IT media 250 may define a blank or previously transferred panel portion 266A that is positioned to be pressed against a first surface 216 of the media card 215. For purposes of the foregoing specification and appended claims the term "blank panel" refers to an IT media panel that is structured not to impart a printed image to a media card. Thus, blank panels could include panels that were not printed, panels that were the subject of prior transfer operations (e.g., previously transferred image panel), or other non-image transferring panels that will be apparent to one of skill in the art.

Upon entering the image transfer station, the thermal compression rollers 255 are urged against and, thus, compress the blank panel 266A and the image panel 267 against the respective first and second surfaces of the media card in the manner illustrated by FIG. 3A above. The image panel 267 is transferred to the second surface 217 of the media card 215, while the first surface 216 of the media card 215 is exposed only to the blank panel 266A and, thus, remains unmarked. In one embodiment, a first thermal compression roller 255A disposed opposite the first surface 216 of the card 215 may remain unheated to ensure that ink remnants from any previously transferred panels 266A are not transferred to the first surface 216 of the media card 215.

Once the image panel 267 has been transferred and the media card is removed from the image transfer station, the IT media 250 is advanced, in the depicted embodiment upwardly along arrow B, such that the just transferred image panel 267 becomes new blank/previously transferred image panel 266A in anticipation of receiving a subsequent media card (not shown) into the image transfer station. New image panel 267A is then positioned for transfer to the second surface of a subsequent media card (not shown). Multiple media cards may be printed in series using this technique.

Although the single-pass double-sided image transfer station 245' shown in FIG. 3B is structured to transfer a printed image to a specific surface of a media card, it will be apparent to one of ordinary skill in the art that various embodiments of the present invention may be structured to transfer printed images to either surface of a media card.

In other embodiments, it may be desirable to print to only a portion of the media card surfaces. For example, in one embodiment, the media card may be only partially fed between the thermal compression rollers thereby transferring printed indicia to only a portion of the opposite surfaces of the media card. In other embodiments, the thermal compression rollers 255 may be movable along the Z arrows depicted in FIG. 3 to facilitate selective partial engagement between the thermal compression rollers and the IT media. Said differently, the thermal compression rollers could periodically thermally engage the IT media to transfer printed indicia to selected portions of the media card as the card translates beneath the thermal compression rollers.

Figure 4:
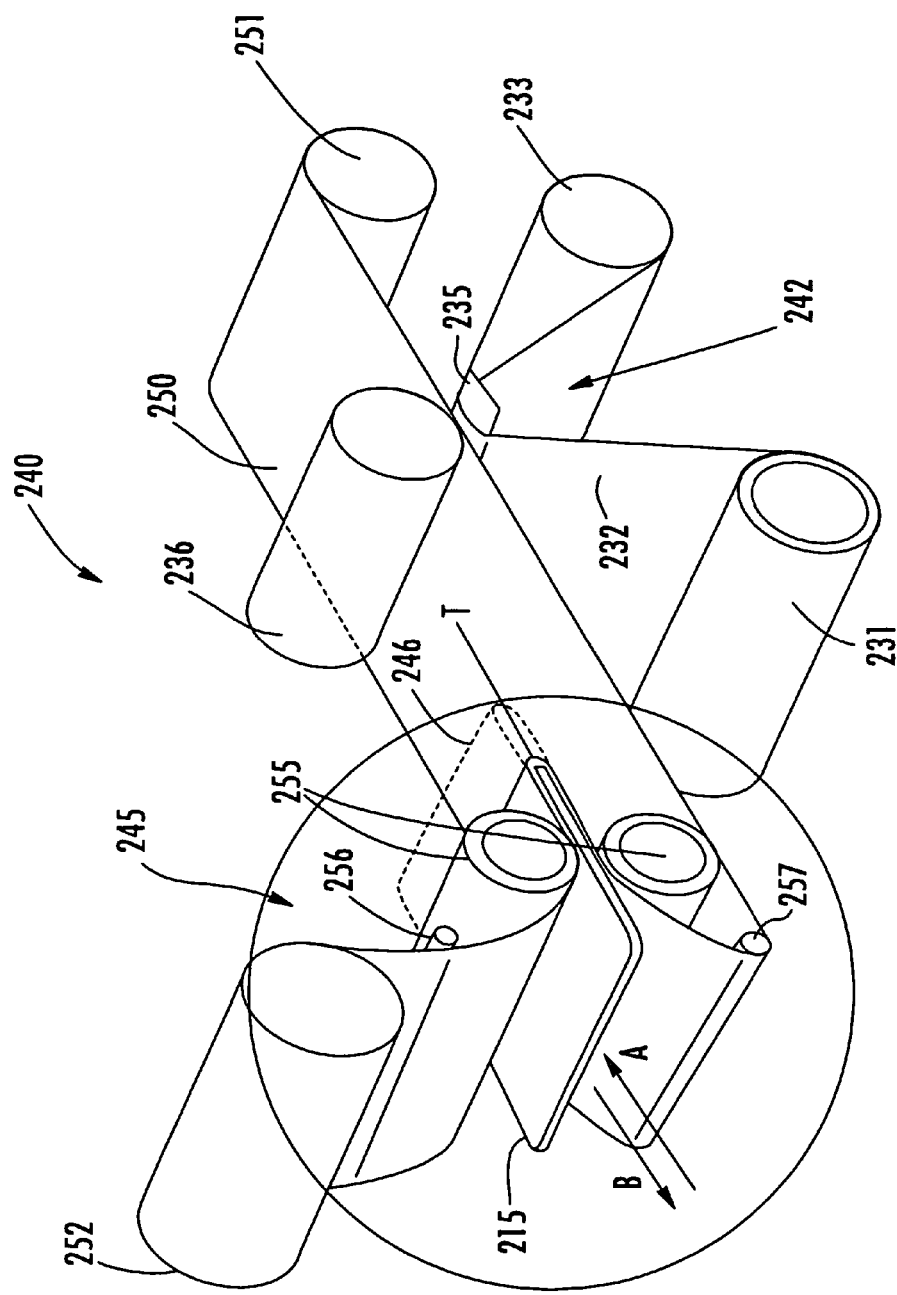
FIG. 4 is a schematic perspective view of a printing assembly including a single-pass double-sided image transfer station in accordance with another embodiment of the invention.

FIG. 4 illustrates a single-pass double-sided printing assembly 240 in accordance with one embodiment of the present invention. The depicted printing assembly 240 includes a single-pass double-sided transfer station 245 and a print station 242. IT media 250 is provided between an IT media supply roll 251 and an IT media take-up roll 252. The IT media supply roll 251 dispenses (in strip form) the IT media 250 past the print station 242 where print is applied to the IT media 250. Further downstream, the IT media 250 extends through the single-pass double-sided image transfer station 245 where portions of the IT media 250 bearing print are transferred onto media cards 215. Several types of IT media 250 that are currently known in the art may be used to facilitate printing according to various embodiments of the present invention.

The IT media supply roll 251 typically includes a rolled strip of IT media 250 wound on a supporting core. The core is rotatably supported to pay out the strip of IT media 250 in response to tension from a positively driven IT take-up roll 252. The IT media supply roll 251 may also be motivated to allow back-and-forth movement of IT media 250, to allow printing of different colors onto the IT media. In the exemplary embodiment of FIG. 4, the printing assembly 240 also includes a pair of free rotating idlers 256, 257, which are positioned adjacent the single-pass double-sided image transfer station 245. In its complete path, the depicted IT media 251 extends off of the IT media supply roll 251, through the print station 242, over a first one of the idlers 257, through the single-pass double-sided image transfer station 245, over a second one of the idlers 256 and onto the IT media take-up roll 252. It should be noted, however, that the storage, path of travel, and motivation of the IT media 250 could be varied. For example, the IT media could be structured in discrete sections, instead of a strip, and dispensed from a cartridge through the print station 242 and the single-pass double-sided image transfer station 245.

The print station 242 includes a color ribbon supply roll 231, a color ribbon take-up roll 233, a thermal printing head 235 and a platen roller 236. The color ribbon supply roll 231 supplies a color ribbon 232 that has, for example, a sequence of colorant panels including yellow (Y), magenta (M), cyan (C) and/or black (K) panels for imprinting of a range of colors or light/dark shades onto the IT media 250 by the thermal printing head 235. Typically, this is referred to as a dye sublimation technique for the Y, M and C panels, and/or mass transfer printing for the K panel. Of course, it should be noted that other types of known printing techniques could be employed as long as they are compatible with printing on IT media 250.

In another embodiment, the print station 242 may include a web of pre-printed ribbon wound about a spool (not shown). In such embodiments, the depicted thermal printing head 235 and platen roller 236 may be replaced by thermal compression rollers that are structured to transfer entire pre-printed images or panels to the IT media from the web as it is played out from the pre-printed ribbon spool. The transferred images could then be re-transferred to media cards or other printable media at a transfer station similar to that depicted in FIG. 4. The pre-printed images or panels could be comprised of mono-chrome or color dyes, inks, etc. In one embodiment, the above pre-printed images or panels could be serially provided on a spooled web to provide a background or distinct color pattern for use on multiple media cards. Further detailed printing of the media card could then be performed through a variety of techniques at subsequent media processing stations.

Returning to the embodiment depicted in FIG. 4, the color ribbon 232 extends off of the color ribbon supply roll 231, adjacent and coextensive with the IT media 250, between the thermal printing head 235 and the platen roller 236 and onto the color ribbon take-up roll 233. One or more idlers (not shown) may be disposed on either side of the thermal printing head 235 for enlarging the coextensive area of the color ribbon and IT media 250 as known in the art. The color ribbon take-up roll 233 is preferably motivated to advance the color ribbon 232 during multiple printing passes and heating of the thermal printing head 235 to impart an image to the IT media 250 before it is advanced to the single-pass double-sided image transfer station 245.

In the depicted embodiment, the single-pass double-sided image transfer station 245 includes a pair of thermal compression rollers 255. As referenced above, the thermal compression rollers may be heated by conductive films, foils, or silicone pads that are disposed on the surface of the rollers. In other embodiments, the thermal compression rollers 255 may be heated internally by a radiant thermal core (not shown). The compression rollers 255 are urged against and, thus, compress opposing surfaces of the media card 215 as the card 215 is fed between the rollers 255 to the print position 246 shown by dashed lines in FIG. 4.

In one embodiment, a media card 215 moves through the IT media 250 along arrow A to the print position 246 as shown. In this regard, the IT media 250 is structured to at least partially envelop the media card 215 as it progresses toward the print position 246. In one embodiment, the thermal compression rollers 255 engage the IT media 250 and the media card 215 gradually beginning at the leading edge of the media card 215 as the card 215 is fed between the rollers 255 to the print position 246. The compression rollers 255 roll across and compress the IT media 250 against opposing surfaces of the media card 215 until reaching the card's trailing edge. Accordingly, air pockets, folds, or imperfections that inhibit print quality may be reduced. Imperfections may also be reduced by providing a sufficient tension between the IT media supply and take-up rolls 251, 252 as referenced above.

The forces of heat and compression applied to the media card 215 by the thermal compression rollers 255 facilitate transfer of printed images (e.g., printed panels 266, 267 shown in FIG. 3) carried by the IT media 250. Once these printed images have been imparted to the media card 215, the media card 215 is retracted from the print position along arrow B as shown. In one embodiment, the IT media supply and take-up rollers 251, 252 are reverse biased during the retraction process to ensure that loosely hanging intermediate transfer media does not disturb a freshly printed media card image. Such reverse biasing has the additional advantage of assisting card retraction by applying a tension force T to the trailing edge of the media card 215 as shown.

Figure 5:
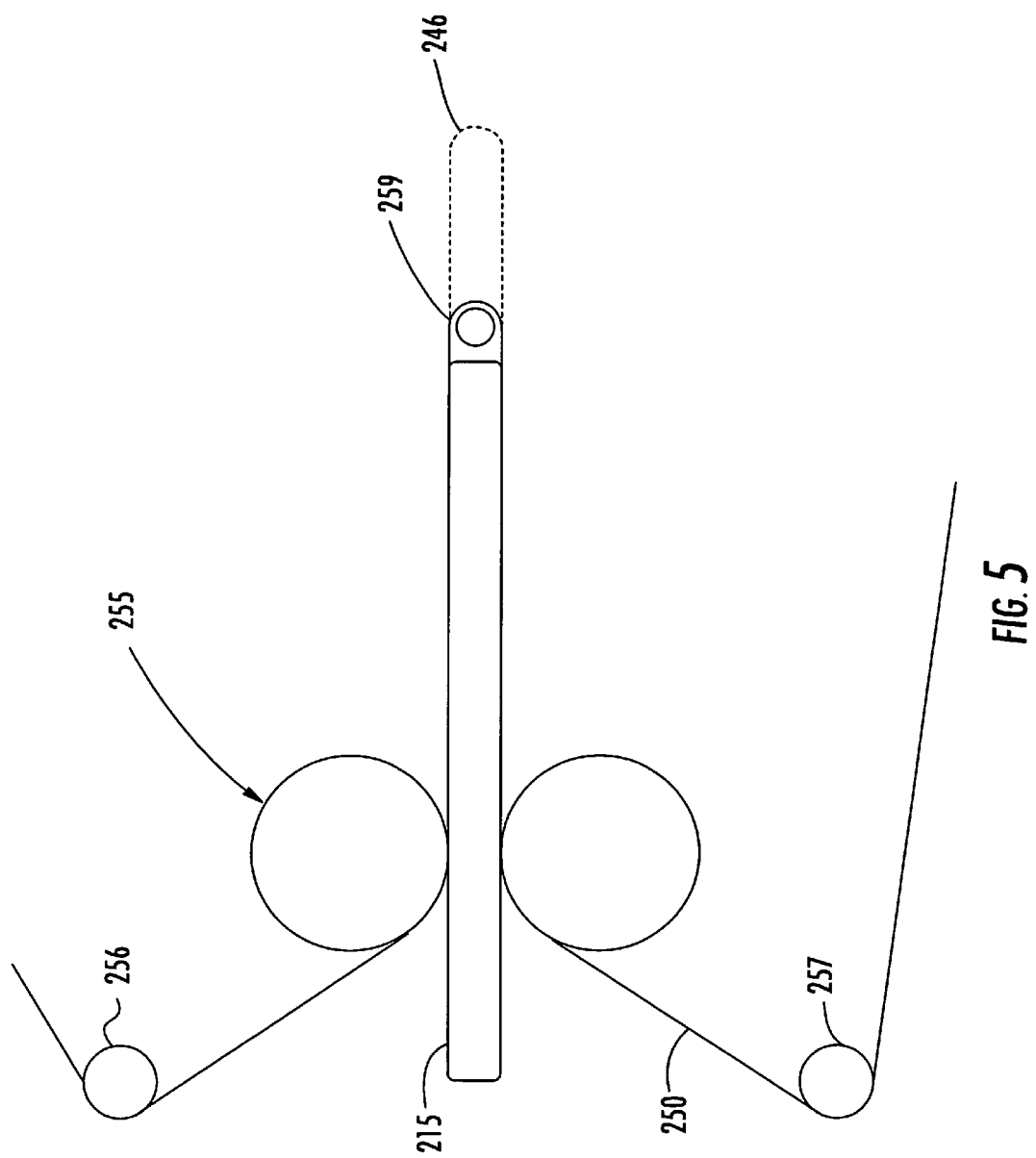
FIG. 5 is a schematic side view of a single-pass double-sided image transfer station incorporating a shutter bar in accordance with one embodiment of the invention.

In some embodiments, for example where media cards 215 having rounded corners or imperfect edges are used, additional steps may be required to ensure that such cards receive an acceptable printed image. Media cards having rounded corners or imperfect (i.e., non-straight) edges may cause the IT media to wrinkle as the media card is driven to the single-pass double-sided image transfer station. Such wrinkles may produce imperfections in the resulting printed image. Accordingly, in one embodiment, as shown in FIG. 5, a shutter bar 259 is structured to precede the media card 215 as the media card 215 is driven to the print position 246. The shutter bar 259 is structured having a straight leading edge and a length equal to or exceeding that of the leading edge of the media card 215. In this regard, the shutter bar 259 ensures continuous tension across the face of the IT media 250 (regardless of media card shape) and thereby reduces imperfections that may reduce print quality.

In other embodiments, the shutter bar 259 need not be a "bar" at all. Instead, a shutter plate (not shown) may be provided for supporting or other printable media as the media is driven to the thermal transfer position. The shutter plate defines a straight leading edge for ensuring continuous tension across the face of the IT media as described above. In one embodiment, the shutter plate defines an aperture for receiving the printable media. The thickness of the shutter plate may substantially match the thickness of the printable media such that when the media is disposed in the aperture the printable surfaces of the media are exposed for receiving transferred images. In another embodiment, one or more shutter plates may be provided having apertures of various shapes (e.g. rectangles, discs, triangles, hexagons, stars, etc.) for receiving similarly shaped printable media. In one embodiment, the above described shutter plates may be particularly effective for receiving relatively flexible printable media such as labels that do not have sufficient stiffness to be driven into the IT media on their own.

The shutter bars or shutter plates described above may be comprised of any thermally resistant material such as metal, ceramic, etc. Further, the shutters bars or shutter plates may be coated or otherwise comprised of adhesion resistant materials. In this regard, IT media adhesion to the shutter bar or plate is limited thereby reducing the likelihood of undesirable IT material buildup on the shutter bar or plate.

In other embodiments of the present invention, positive or negative gas (e.g., air, other inert gases, etc.) pressure may be used to manipulate various media within media processing devices referenced herein. For example, positive or negative gas pressure could be used to hold a media card in a selected position or to eject the card from the selected position when an operation is complete. In other embodiments, positive or negative gas pressure could be used for providing continuous tension across the face of an IT media web or dye ribbon. Other similar uses of positive or negative gas pressure will be apparent to one of ordinary skill in the art in view of the disclosure provided herein.

Figure 6:
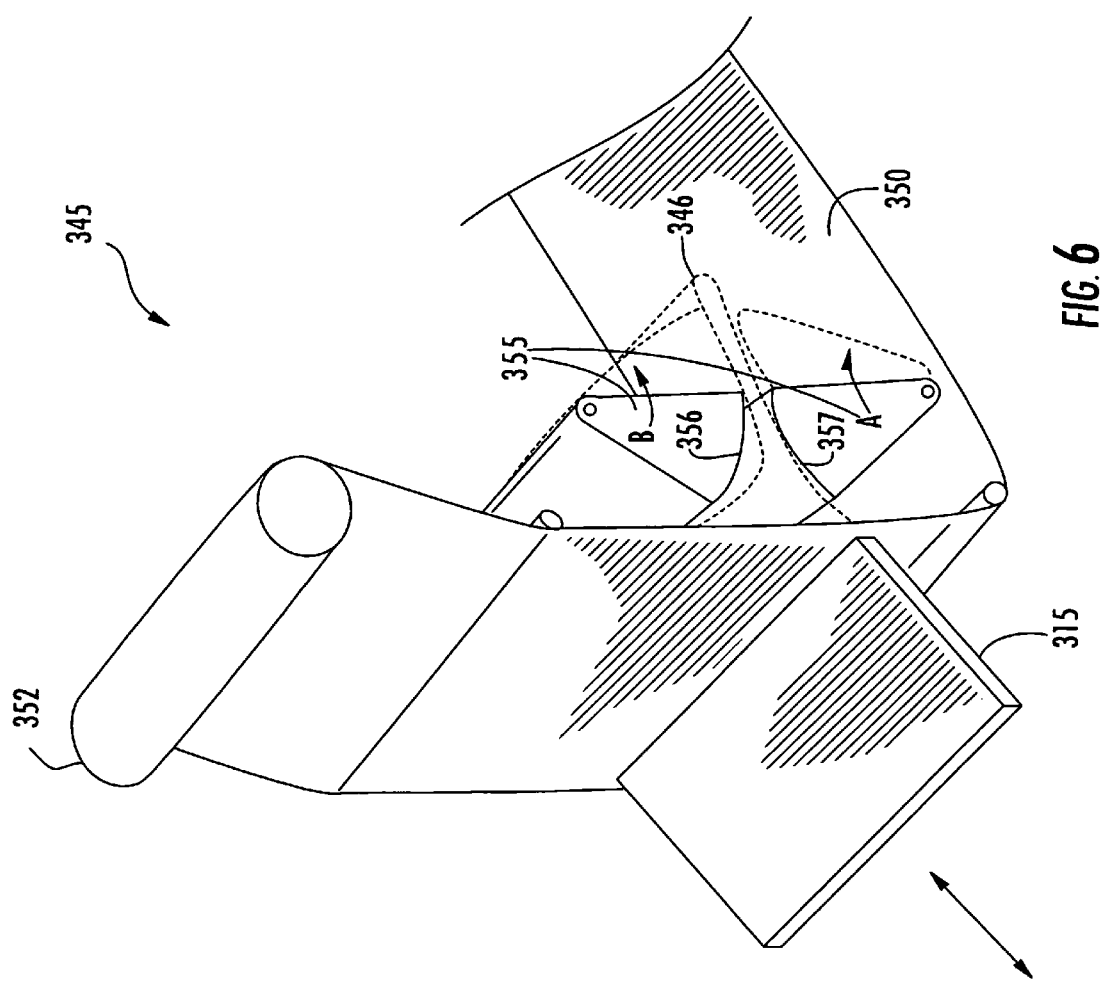
FIG. 6 is a schematic illustration of a single-pass double-sided image transfer station incorporating arcuate platens in accordance with another embodiment of the invention.

FIG. 6 depicts a single-pass double-sided image transfer station 345 in accordance with another embodiment of the present invention. In the depicted embodiment, one or more printed images are transferred from the IT media 350 to the media card 315 via opposed thermal arcuate platens 355 instead of the thermal compression rollers described in reference to FIGS. 2-5. In the depicted embodiment, the arcuate platens 355 have a "pawl-like" shape and define opposed arcuate surfaces 356, 357 that are adapted to compress the IT media 350 into opposed surfaces of the media card 315 as the card is driven to the print position 346 shown by dashed lines in FIG. 6. The arcuate surfaces 356, 357 of the arcuate platens 355 compress the IT media 350 against the media card 315 as the arcuate platens 355 rotate along arrows A and B as shown. In various embodiments, the arcuate platens 355 are heated by surface films, foils, silicon pads, or radiant core heating devices as described above.

In one embodiment, the arcuate platens 355 may be produced having arcuate surfaces 356, 357 that possess a reduced curvature as compared to the thermal compression rollers described above. Said differently, arcuate platens may be produced having arcuate surfaces possessing a curvature that would allow the arcuate surfaces of the arcuate platens to abut the IT media and the media card over a greater interference area than would be possible using thermal compression rollers. In this regard, the relatively low curvature of the arcuate surfaces of the arcuate platens may provide relatively continuous heating and a more uniform compressive load distribution across the surface of the media card during the thermal transfer of a printed image.

Figure 7:
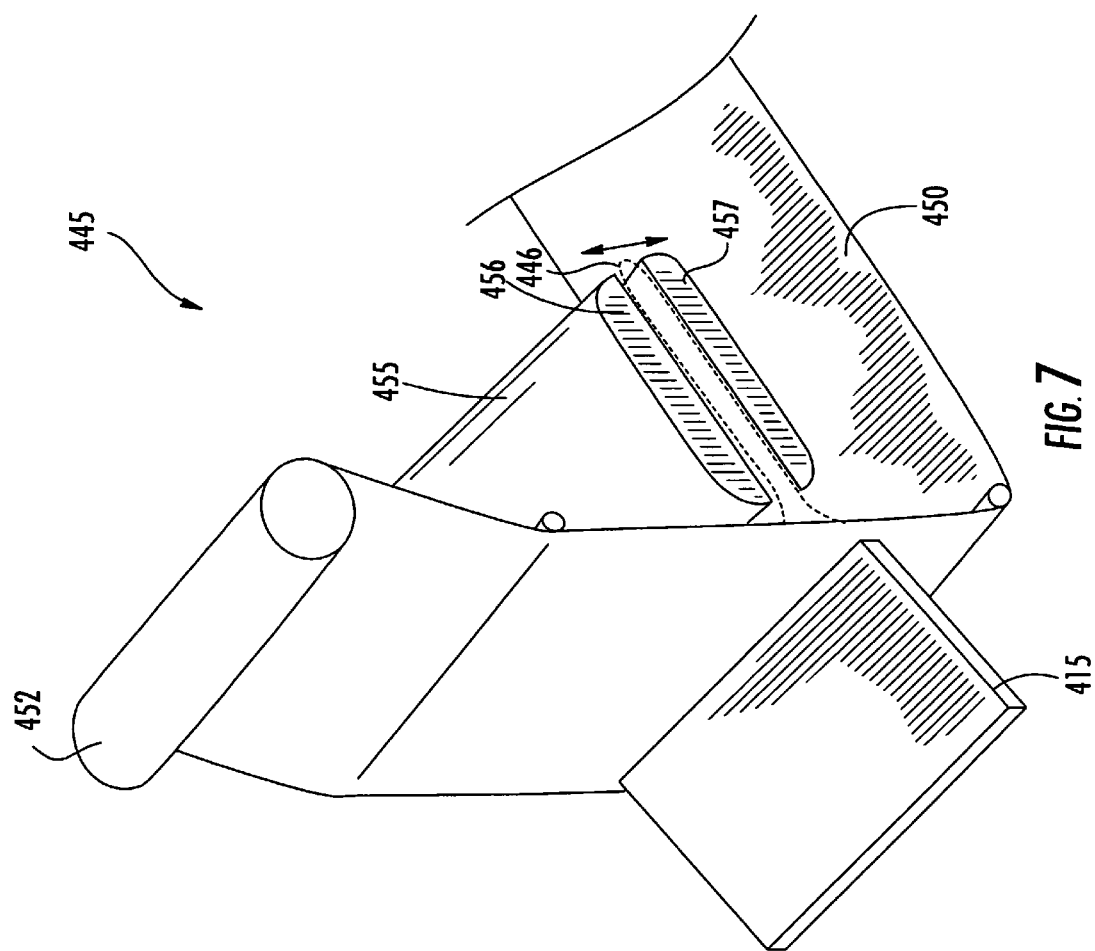
FIG. 7 is a schematic illustration of a single-pass double-sided image transfer station incorporating a reciprocating clamp in accordance with another embodiment of the invention.

FIG. 7 depicts a single-pass double-sided image transfer station 445 in accordance with yet another embodiment of the present invention. In the depicted embodiment, a reciprocating clamp 455 is provided for compressing the IT media 450 against opposed surfaces of the media card 415. In one embodiment, the reciprocating clamp 455 is comprised of opposed plates 456 and 457 as shown. Once again, as described above, the media card 415 is driven through tension provided in the IT media 450 to a transfer position 446 shown in dashed lines in FIG. 7. The IT media 450 at least partially envelops the media card 415 as the card is driven to the transfer position 446. In the depicted embodiment, the reciprocating clamp 455 is moved from an open position where the opposed plates 456, 457 are spaced apart, to a closed position to compress the IT media 450 against the opposed surfaces of the media card 415. Further, the opposed plates 456, 457 of the reciprocating clamp 455 may be heated through any of the surface or radiant core heating techniques described above. In this regard, heat and compression is applied to the IT media 450 and media card 415 for imparting a printed image to opposing surfaces of the media card as shown.

Figure 8:
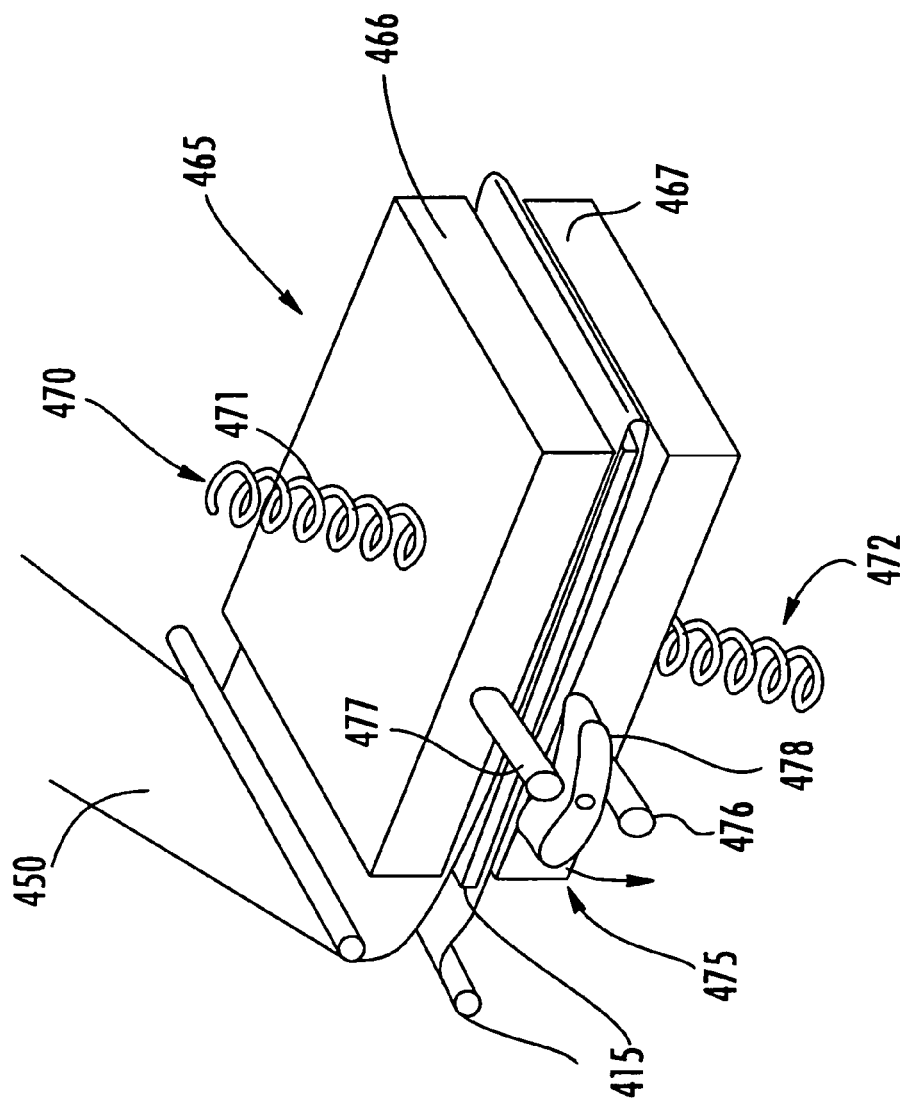
FIG. 8 is a schematic illustration of a single-pass double-sided image transfer station incorporating a spring-biased reciprocating clamp in accordance with another embodiment of the invention.

The opposed plates of the reciprocating clamps of various embodiments of the present invention may be driven between open and closed positions by a variety of drive mechanisms. One such drive mechanism is depicted in FIG. 8. In the depicted embodiment, a reciprocating clamp 465 includes first and second opposed plates 466, 467 that are driven to a closed position via a compression spring mechanism 470. The compression spring mechanism 470 includes one or more compression springs 471, 472 coupled to each of the opposed plates 466, 467. The compression springs 471, 472 drive the plates 466, 467 together into a closed position as shown.

In one embodiment, a cam structure 475 is provided for driving the opposed plates 466, 467 apart, against the compressive force of the compression springs, and thus ultimately forcing the plates into an open position. In the depicted embodiment, the cam structure 475 includes first and second tabs 476 and 477 extending from the opposed plates 456, 457 of the reciprocating clamp 465. Although shown as post-type members, the first and second tabs 476, 477 may be opposed substantially planar flanges or other similar structures as may occur to one of ordinary skill in the art. The cam structure further includes a rotatable cam member 478. Rotation of the cam member 478 drives the first and second tabs 476, 477 apart thereby driving the reciprocating clamp 465 to an open position.

In other embodiments, several other drive mechanisms may be used. For example, in one embodiment, the opposed plates of the reciprocating clamp may be driven between open and closed positions by an electric motor-based drive system, a pneumatic piston-based drive system, a hydraulic piston-based drive system, or other similar drive systems known in the art.

The above discussion has centered exclusively on use of thermal compression rollers, opposed arcuate platens, and reciprocating clamps used to affect transfer of a printed image to opposed surfaces of media cards. In alternate embodiments of the present invention, such thermal compression rollers, opposed arcuate platens, and reciprocating clamps may be used to transfer protective laminate patches, with our without printed indicia, to opposed surfaces of media cards. In such embodiments, the IT media may be replaced with a carrier media that is adapted to support the protective laminate patches. The laminates patches may be adapted to receive printed images by means of the printing techniques noted above as will be apparent to one of ordinary skill in the art.

Figure 8A:
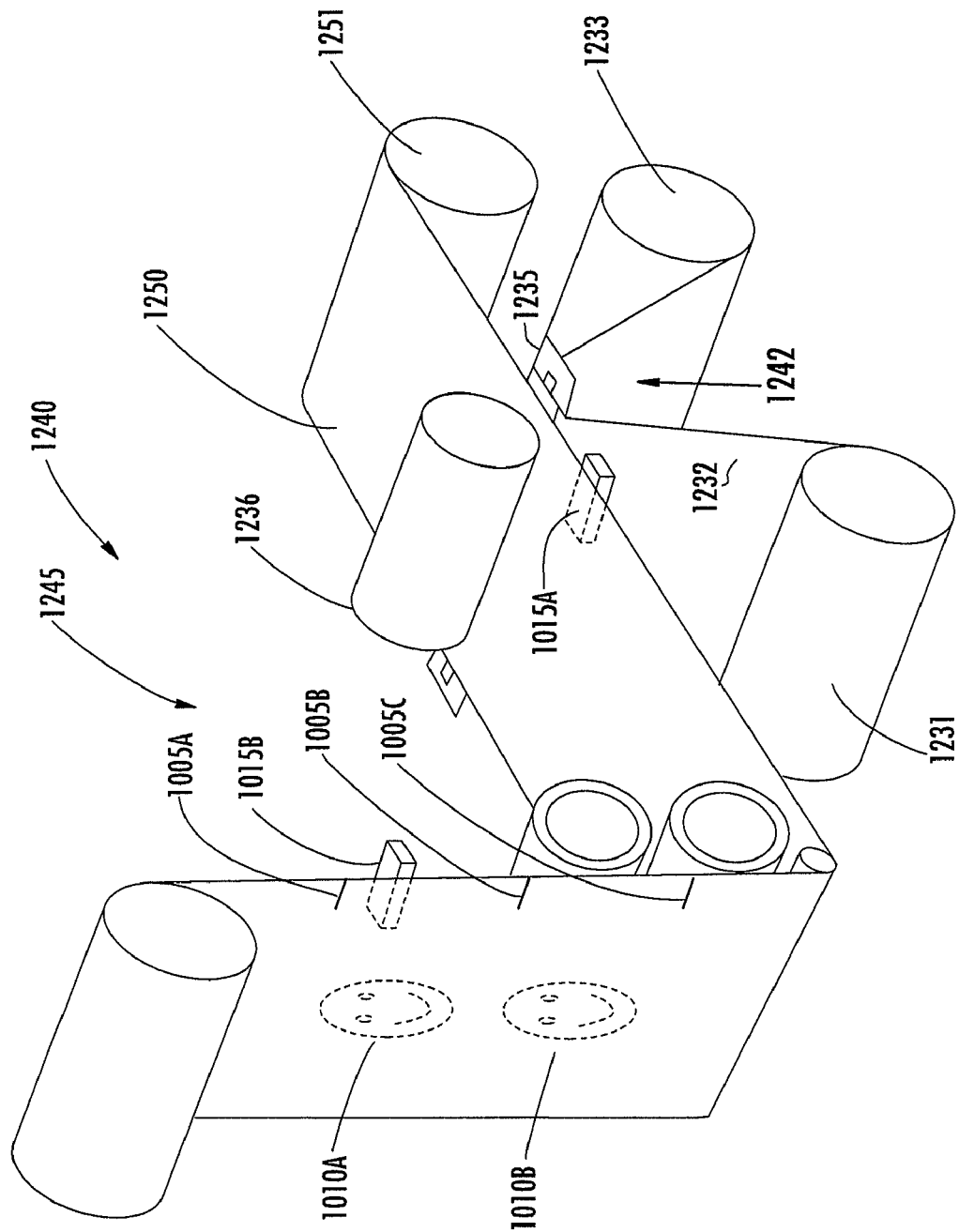
FIG. 8A is a schematic perspective view of a single-pass double-sided printing assembly adapted for printing in-situ reference marks to the intermediate transfer media in accordance with another embodiment of the invention.

FIG. 8A illustrates a single-pass double-sided printing assembly 1240 structured in accordance with another embodiment of the present invention. The depicted single-pass double-sided printing assembly 1240 includes a print station 1242 that is adapted to print at least one registration mark 1005 to the IT media 1250. A common problem with printing images or other indicia to IT media is that the printer controller needs to establish proper registration of the image for each color printing pass (i.e., Y, M, C, K). Precise control of the motion of the IT media 1250 proximate the thermal printing head 1235 is important for producing high resolution images. It has traditionally been difficult to accurately determine the linear motion of the IT media 1250 based on the rotary motion of the motor driving the IT media supply spool 1251. This difficulty is exacerbated by the gradual reduction in diameter of the ribbon supply as the ribbon is let out through usage.

Various embodiments of the present invention address the above problems and achieve other advantages by providing a printing method whereby at least one registration mark 1005 is printed to the IT media 1250 on a first printing pass. In the depicted embodiment, sensors 1015 are provided proximate the IT media 1250 for detecting the location of the at least one registration mark 1005. The sensors 1015 may be optical sensors, photo sensors, infrared sensors, or other types of sensors that may be apparent to one of ordinary skill in the art in view of this disclosure. Sensors 1015 may be disposed adjacent the thermal print head 1235 and the single-pass double-sided image transfer station 1245 as shown. In this regard, the sensors 1015 may detect the position of the printed registration marks 1005 during printing of an image 1010 to the IT media 1250 and during transfer of the image 1010 from the IT media 250 to a media card (not shown). Thus, the precision of the printing and image transfer steps may be substantially enhanced.

In the depicted embodiment colorant ribbon 1232 is advanced from the ribbon supply spool 1231 over a thermal print head 1235 as shown. Similarly, the IT media 1250 is advanced from an IT media supply spool 1251 such that the IT media 1250 is disposed proximate the colorant ribbon 1232. As noted above, the thermal print head 1235 prints at least one registration mark 1005 to the IT media. In the depicted embodiment, the IT media 1250 is then advanced immediately downstream such that at least one registration mark 1005 is disposed proximate a first sensor 1015A as shown. In other embodiments, the first sensor 1015A may be positioned upstream of the thermal print head 1235 as will be apparent to one of ordinary skill in the art. In the depicted embodiment, once the first sensor 1015A detects the at least one registration mark 1015 the thermal print head 1265 is engaged to print an image 1010 to the IT media 1250. As will be apparent to one of ordinary skill in the art, the first sensor 1015A and the thermal print head 1235 may be disposed in close proximity to ensure tight spacing between the printed reference mark and the printed image. Additionally, such spacing may be further tightened by a post-reference mark printing backfeed step.

As noted above, the depicted embodiment includes colorant ribbon 1232 comprising a sequence of colorant panels including yellow (Y), magenta (M), cyan (C) and/or black (K) panels for imprinting of a range of colors or light/dark shades onto the IT media 1250. In one embodiment, the thermal print head 1235 is engaged to print a first registration mark 1005A (of any color including Y, M, C, K, or some combination thereof) and then print an image 1000A to the IT media 1250 immediately upstream of the first registration mark 1005A using a first colorant panel (e.g., Y, M, C, etc.). Although shown as a series of short lines, registrations marks of various embodiments of the invention may take any size or shape and may be visible in any spectrum of light (e.g., infrared, etc.) so long as they are detectable by one or more sensors. The IT media 1250 may then be reversed until the first registration mark 1005 is again aligned with the first sensor 1015A. The IT media 1250 is then advanced and the image is reprinted using a second colorant panel (e.g., Y, M, C, etc.). This process may be repeated multiple times depending upon the relative complexity of the printed image as will be apparent to one of ordinary skill in the art.

Multiple additional images may be printed to the IT media using the method noted above. For example, in one embodiment a second image 1010B may be printed to the IT media 1250 immediately upstream of the first image 1010A as shown. The depicted first and second images 1010A, 1010B are adapted for transfer to first and second sides of a media card (not shown). In various embodiments of the present invention, multiple additional registration marks 1005B, 1005C may be printed to the IT media 1250 in various known locations relative to the printed first and second images 1010A, 1010B. As will be apparent to one of ordinary skill in the art, such registration marks 1005A, 1005B, 1005C may be detected by a second sensor 1015B mounted proximate the single-pass double-sided image transfer station 1245 for precisely locating the IT media 1250 prior to transfer of the first and second images 1010A, 1010B to the media card.

Figure 9:
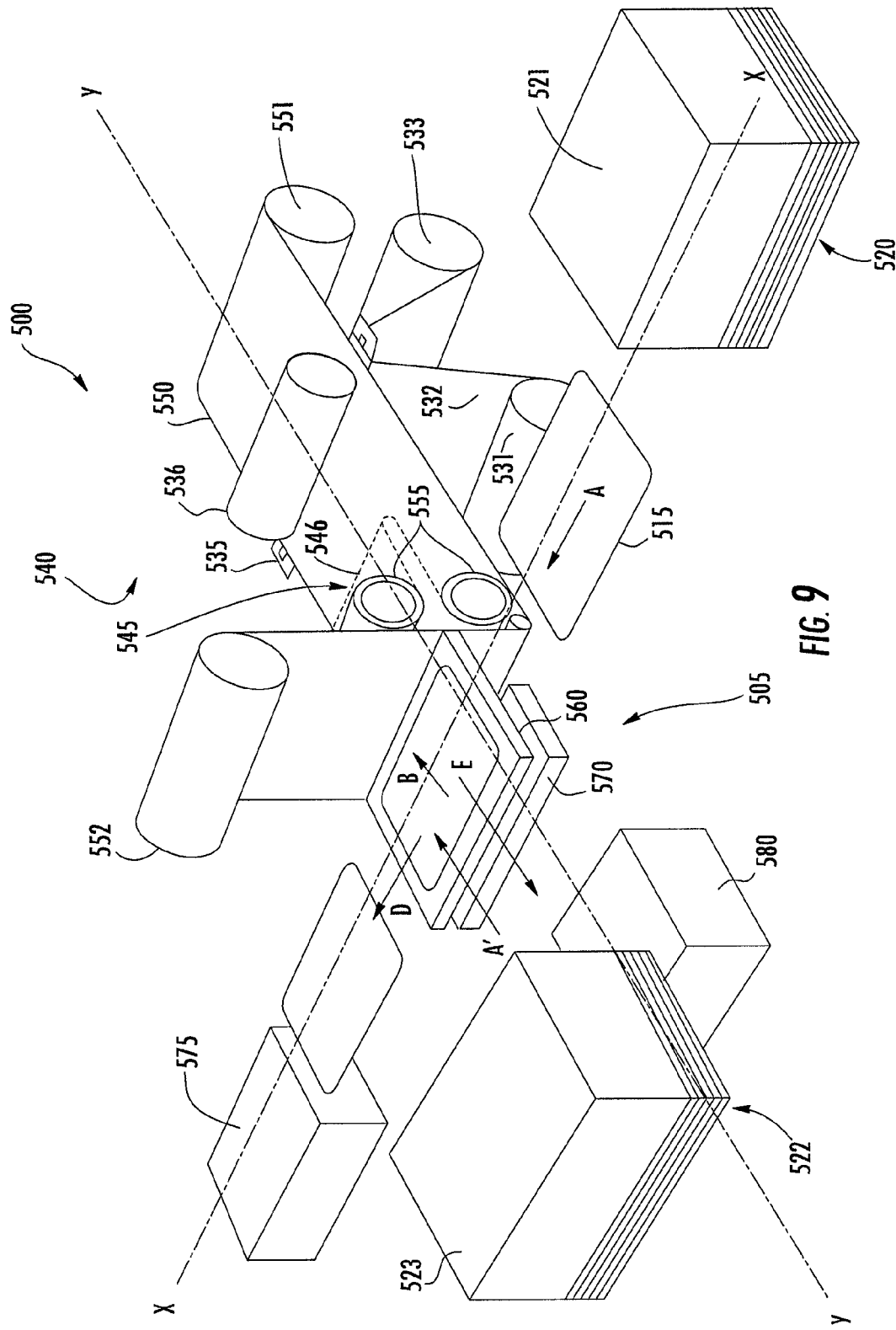
FIG. 9 is a schematic illustration of a printer incorporating a cross feed architecture and a single-pass double-sided image transfer station in accordance with one embodiment of the invention.

FIG. 9 is a schematic illustration of a printer 500 incorporating a cross feed architecture 505 and a printing assembly 540 according to various embodiments of the present invention. In the depicted embodiment, media cards 515 are drawn in a SEL orientation from a card feeder 521 disposed at a first load station 520. The media cards 515 are transferred from the card feeder 521 in the X direction along arrow A to a cross feed station 560. The cross feed station 560 is the intersection point or origin for the cross feed architecture 505 of the depicted embodiment as will be discussed in greater detail below.

In another embodiment, media cards 515 may be loaded automatically in a LEL orientation by a card feeder 523 at a second load station 522. Once loaded at load station 522, the media cards 515 are then transmitted to the cross feed station 560 in the Y direction along arrow A'. Additionally, in other embodiments, the first and/or second load stations 520, 522 may be augmented by an ATM-type card slot (not shown) of SEL or LEL orientation as appropriate. In such embodiments, a user may manually feed media cards into the ATM-type card slot in a manner that is commonly used to operate conventional automatic teller bank machines. Once such ATM-type cards are loaded at load station 522, they are similarly transmitted to the cross feed station 560 in the Y direction along arrow A'. In the depicted embodiment, the X direction is associated with a SEL card feed orientation while the Y direction is associated with a LEL card feed orientation. In alternate embodiments, the X or Y directions may be associated with SEL or LEL card feed orientations as will be apparent to one of ordinary skill in the art.

In the depicted embodiment, media cards 515 are transported to the cross feed station 560 via one or more transport devices (e.g., transport rollers, belt drives, etc.)(not shown). In alternate embodiments, one or more media processing stations (e.g., cleaning station, printing station, encoding station, etc.)(not shown) may be disposed between the cross feed station 560 and the first or second loading stations 520, 522. For example, in one embodiment a print station (not shown) may be provided between the first load station 520 and the cross feed station 560 for immediately printing a serial number to a loaded media card 515.

Printable media such as media cards often include a programmable memory such as a magnetic strip or an RFID chip (not shown). In the depicted embodiment, a programming head 570 (or heads) is disposed proximate to the cross feed station 560 for reading, writing to, or otherwise programming the programmable memory of the media card 515. The SEL and LEL card feed flexibility of various embodiments of the present invention allows media cards to be encoded without the paused LEL card encoding technique referenced above. For example, in the depicted embodiment, the encoding station 570 is disposed along the X axis such that media cards 515 travel in a SEL orientation relative to the encoding station 570. In embodiments where the SEL card feed orientation is associated with the Y axis, the encoding station may be disposed along the Y axis. In this regard, a stationary encoding head (not shown) may be used to efficiently encode, read, or otherwise program the media card 515 as it progresses efficiently along the X axis as shown. Said differently, the media cards 515 need not be paused to await a transversely aligned magnetic read/write head or other programming device that operates by translating along the media card as described above with regard to FIG. 1.

In the embodiment depicted in FIG. 9, if encoding or programming operations are unsuccessful due to a defective programmable memory within the media card 515 or due to device malfunction, the card 515 may be immediately transferred from the cross feed station 560 in the Y direction along arrow E to reject hopper 580. In other embodiments, the reject hopper 580 may be omitted or replaced with a card voiding station (not shown) wherein a rejected media card may be punched, mutilated, or simply printed with rejection suggesting indicia (e.g., "void", "reject", "do not use", etc.). In this regard, a separate reject hopper may not be required as a user would be able to visually distinguish defective media card.

In another embodiment, after a successful programming action, the media card 515 may be transmitted from the cross feed station in the Y direction along arrow B to a single-pass double-sided image transfer station 545. The depicted cross feed architecture is modular in nature and, thus, the first load station 520, second load station 522, single-pass double-sided image transfer station 545, and reject hopper 580 may be replaced with various other media processing operations without deviating from the present invention as discussed in greater detail below.

The printer depicted in FIG. 9 incorporates a printing assembly 540 that is structured to print indicia to media cards 515 positioned at the single-pass double-sided image transfer station 545. As will be apparent to one of ordinary skill in the art, the depicted printing assembly 540 is structured similarly to the printing assembly depicted in FIG. 4. Thus, as referenced above, the media card 515 moves through the IT media 550 along arrow B to an image transfer position 546 shown by dashed lines in FIG. 9. In the depicted embodiment, the media card 515 is fed toward the image transfer position 546 in a LEL orientation. In alternate embodiments, the media card 515 may be fed toward the image transfer position 546 in a SEL orientation as will be apparent to one of ordinary skill in the art. The IT media 550 is structured to at least partially envelop the media card 515 as it progresses toward the image transfer position 546. The thermal compression rollers 555 engage the IT media 550 and compress the IT media against opposed surfaces of the media card 515. Thus, printed images may be transferred to the media card 515 in a single pass as referenced above. Once the printed images have been imparted to the media card 515, the media card 515 is retracted from the image transfer position to the cross feed station 560. In one embodiment, the IT media supply and take-up rollers 551, 552 are reverse biased during the retraction process to ensure that loosely hanging intermediate transfer media does not disturb a freshly printed media card image. Such reverse biasing has the additional advantage of assisting card retraction by applying a tension force to the trailing edge of the media card 515 as it leaves the transfer station.

Upon retraction to the cross feed station 560, the media card may be processed in a variety of ways. For example, the media card 515 may be transmitted in the X direction along arrow D to a card lamination station 575 as shown. After lamination, the media card may be transported further downstream in the X direction to a media receiving hopper (not shown). Alternatively, in embodiments where lamination is not required the lamination station may be bypassed or simply removed such that the media card proceeds directly to the media receiving hopper for subsequent retrieval by an operator.

As referenced above, the depicted lamination station 575, reject hopper 580, and single-pass double-sided transfer station 545 may be replaced with various other media processing operations as defined above. In this regard, the cross feed architecture of various embodiments of the present invention is modular in nature. This modularity provides added flexibility to the printer or media processing device both in terms of operation and in terms of efficiently packaging the many media processing systems housed within the media processing device.

Figure 10:
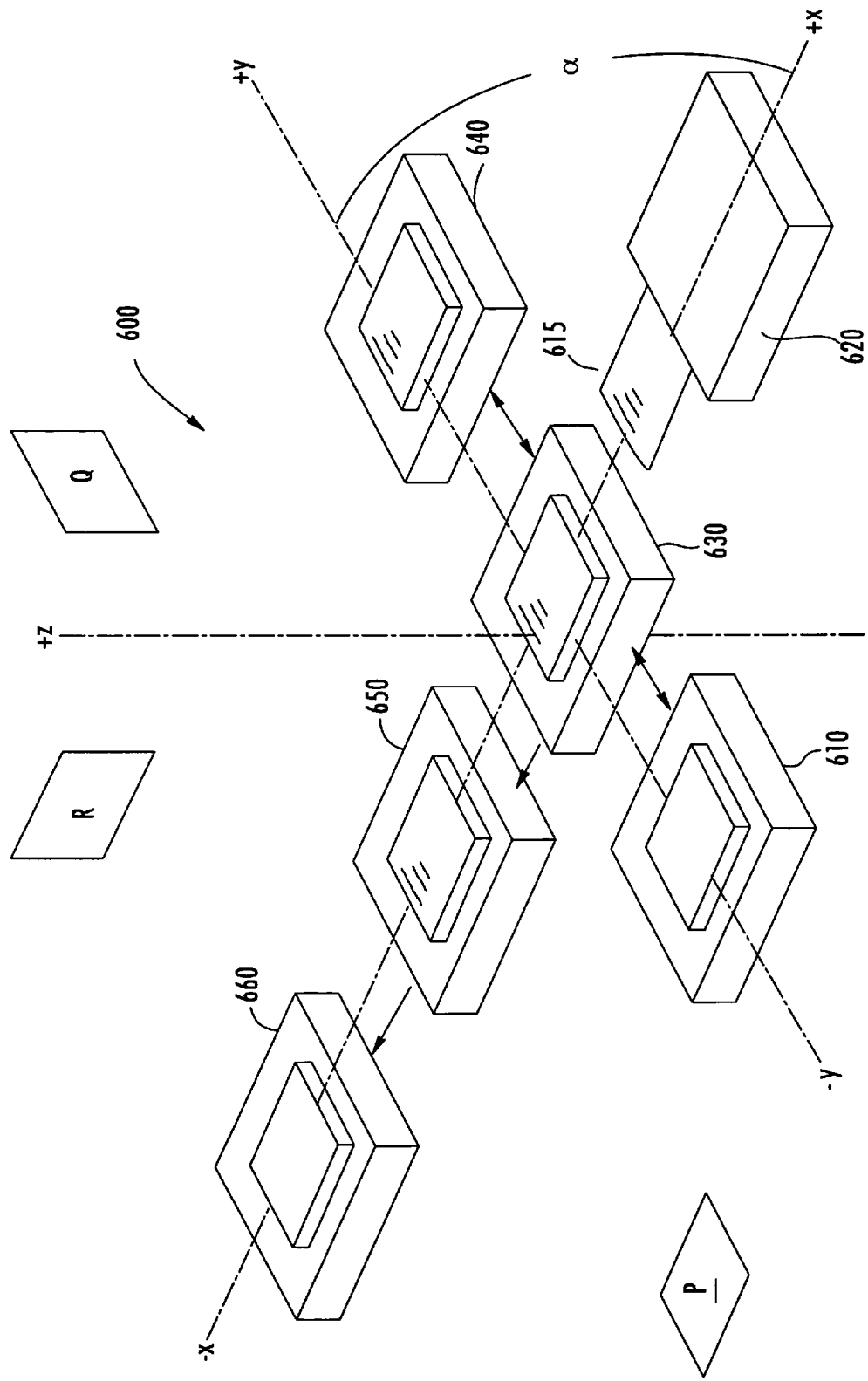
FIG. 10 is a schematic illustration of a cross feed architecture in accordance with one embodiment of the invention.

FIG. 10 is a schematic illustration of a cross feed architecture 600 in accordance with one embodiment of the present invention. In the depicted embodiment, the cross feed architecture 600 is incorporated into a printer for printing media cards 615. The term "cross feed architecture" as used in this specification and the appended claims refers to a media card processing path wherein the media card is directed along at least two axes defined substantially within a given plane. The depicted cross feed architecture 600 is defined along coordinate axes X-Y-Z for illustration purposes. The X axis is defined generally along a longitudinal direction (i.e., along the long axis of the depicted media cards) while the Y axis is positioned generally transverse (i.e., at some angle α) to the longitudinal direction. Certain axes are defined as positive (+) or negative (−) to illustrate the relative position of various card processing stations disposed along the media card processing path. Such coordinate axes definitions are readily alterable without deviating from the inventive concepts herein described and, therefore, should not be construed as limiting.

The cross feed architecture 600 of FIG. 10 includes a media card processing path extending along the X and Y axes substantially within plane P. In the depicted embodiment, a cross feed station 630 is defined at the origin of coordinate axes X-Y-Z. In one embodiment, a card feeder 620 is disposed generally along the positive X axis as shown. The card feeder 620 encloses a plurality of media cards 615 and dispenses the cards 615 individually as commonly known in the art. In one embodiment, the card feeder 620 dispenses individual media cards 615 in a short-edge-leading ("SEL") orientation as shown. In alternate embodiments, the card feeder 620 may dispense media cards 615 in a long-edge leading ("LEL") orientation (not shown).

In one embodiment, the media card 615 is drawn from the card feeder 620 and fed along the X axis to the cross feed station 630 as shown. Such media card movement may be facilitated though use of transport rollers, belt drives, trucks, or other similar devices known in the art. In the depicted embodiment, the cross feed station 630 is positioned immediately downstream of the card feeder 620, however, in alternate embodiments, intermediate media processing stations (e.g., printing stations, encoding stations, cleaning stations, test stations, RFID read stations, etc.) may be positioned along the X axis between card feeder 620 and the cross feed station 630.

Figure 11A:
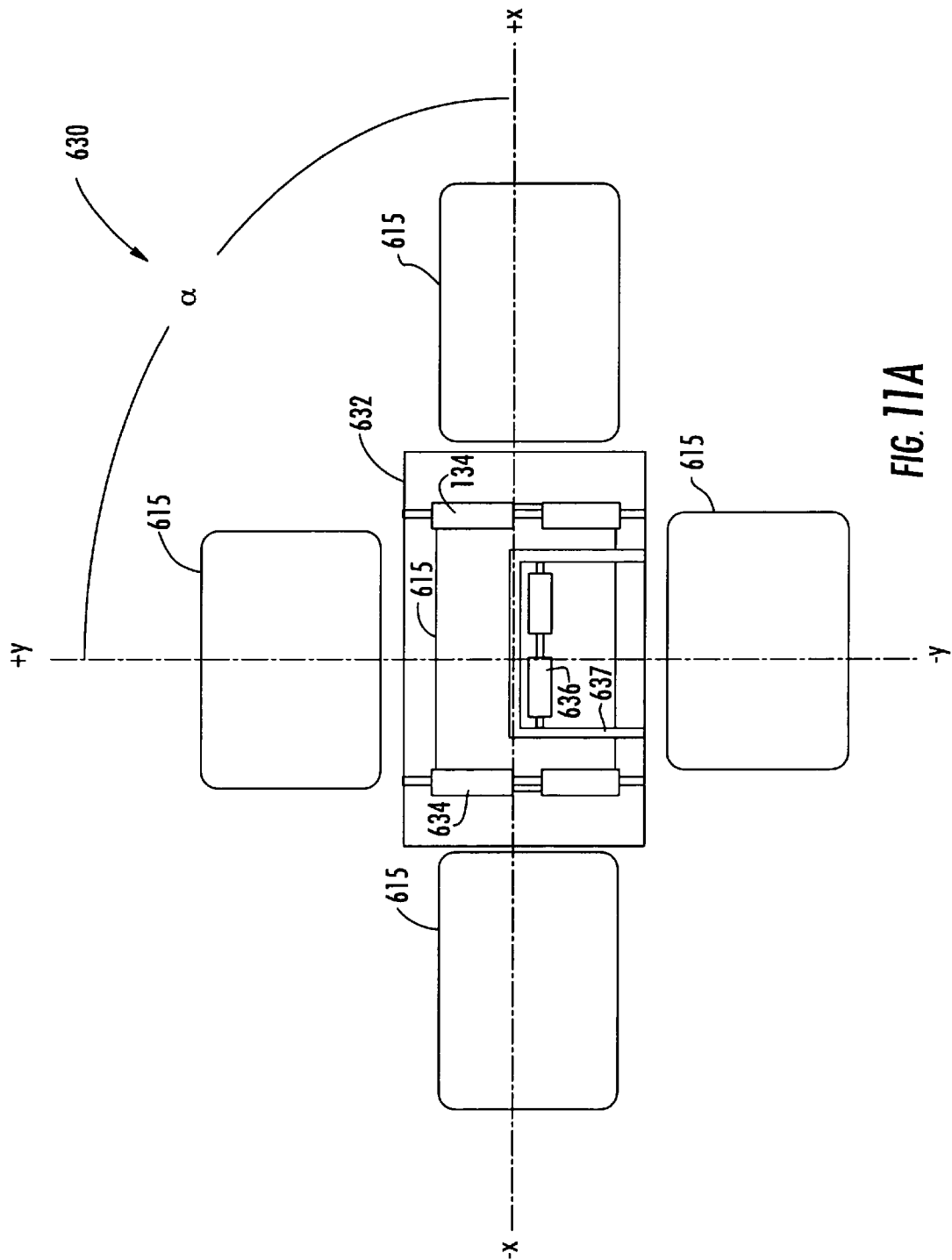
FIG. 11A is a top view of a cross transport mechanism in accordance with one embodiment of the invention.

In another embodiment, as shown in FIG. 11A, the cross feed station 630 includes a cross transport mechanism 632 that is structured to accept media cards along a first axis and then feed the media cards along a second axis that is transverse to the first axis. In the depicted embodiment, the cross transport mechanism 632 is comprised of one or more first rollers 634 for driving media cards 615 along a first axis (e.g., the X axis). One or more second rollers 636 are also provided for driving media cards along a second axis (e.g., the Y axis). In the depicted embodiment, the one or more second rollers 636 are supported by a frame 637 as shown. The first and second rollers 634, 636 are rotatable in either a clockwise or counterclockwise direction for driving a media card in any of the positive X, negative X, positive Y, and negative Y directions as shown. In one embodiment, the first and second rollers 634, 636 are movable along the Z axis for selectively engaging the media cards 615 to move in a desired direction.

In the depicted embodiment, the cross transport mechanism 632 is structured to convert the feed path of a media card between SEL and LEL orientations. For example, media cards 615 entering the cross feed station from the X direction are disposed in a SEL orientation. Such media cards 615 are converted to a LEL orientation as they are fed by the cross transport mechanism 632 along the Y direction. Alternatively, media cards 615 entering the cross feed station 630 from the Y direction are disposed in a LEL orientation and converted to a SEL orientation by the cross transport mechanism 632 as they exit the cross feed station 630 in the X direction. In alternate embodiments, the orientation of the cross transport mechanism may be varied such that the LEL orientation is associated with the X direction and the SEL direction is associated with the Y direction as will be apparent to one of ordinary skill in the art.

The cross transport mechanism 632 of FIG. 11A is structured to cross feed media cards along two substantially perpendicular axes (i.e., the X axis and the Y axis). Cross transport mechanisms 632 according to various embodiments of the present invention are not limited to this substantially perpendicular arrangement and, in fact, may be structured to cross feed media cards 615 at angles a less than or greater than 90 degrees. For example, in one embodiment, the second rollers 636 may be fixed in a given orientation to feed media cards 615 at non-perpendicular angles relative to the first rollers 634. In other embodiments, the first or second rollers 634, 636 may be "steerable" through a variety of known techniques to feed media cards 615 at non-perpendicular angles.

Figure 11B:
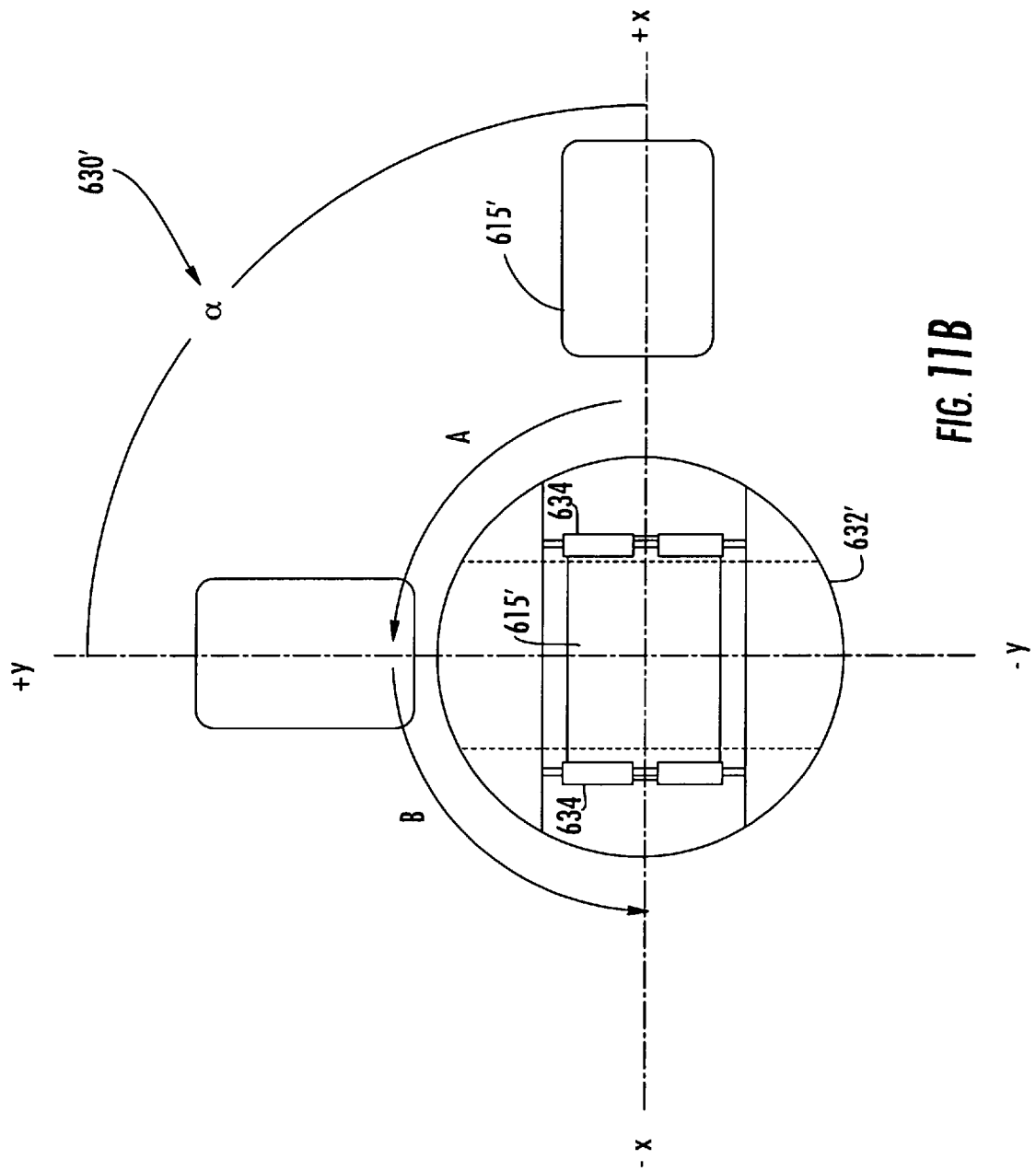
FIG. 11B is a top view of a cross transport mechanism in accordance with another embodiment of the invention.

FIG. 11B depicts a cross transport mechanism 632' for feeding media cards 615'along first and second axes in accordance with another embodiment of the present invention. In the depicted embodiment, the cross transport mechanism 632' is comprised of a "lazy-susan" type rotatable structure having one or more transport rollers 634 for driving media cards 615' along a first axis (e.g., the X axis). In one embodiment, the cross transport mechanism 632' is rotatable from a first position to a second position along arrow A. In the first position, the cross transport mechanism 632' is aligned to feed media cards along the X axis as shown. In the second position (shown in dashed lines), the cross transport mechanism 632' is aligned to feed media cards along the Y axis as shown. In one embodiment, the cross transport mechanism 632' is further rotatable from the second position to a third position along arrow B as shown. In the third position, the cross transport mechanism 632' is once again aligned to feed media cards along the X axis. In alternate embodiments, the cross feed mechanism 632' may simply be returned from the second position to the first position to provide X axis feed alignment. As referenced above, the one or more transport rollers 634' may be movable along the Z axis for selectively engaging the media cards 615' to move in a desired direction.

In various embodiments, the first, second, and third positions described above need not be disposed at 90 degree intervals as shown. For example, in one embodiment, the second position may be offset relative to the first position by an angle α that is less than or greater than 90 degrees to produce cross feed axes (i.e., X and Y axes) that are less than or greater than 90 degrees. Other similar cross feed orientations will become apparent to one of ordinary skill in the art in view of the above disclosure.

Referring again to the cross feed architecture depicted in FIG. 10, in one embodiment, the media card 615 is transmitted from the cross feed station 630 along the positive Y axis to a first +Y station 640 as shown. The media card 615 may then be fed downstream along the positive Y axis to additional stations, i.e., second +Y station, third +Y station, etc. (not shown), for subsequent card processing. In one embodiment, upon completion of one or more processing stations disposed along the positive Y axis the media card feed direction is reversed (i.e., by reversing the rotation of one or more drive rollers, drive belts, etc.) and the media card 615 is returned to cross feed station 630.

In another embodiment, the media card 615 is fed from the cross feed station 630 along the negative Y axis to a first −Y station 610 as shown. The media card 615 may then be fed downstream along the negative Y axis to additional stations, i.e., second −Y station, third −Y station, etc. (not shown), for subsequent card processing. In one embodiment, upon completion of one or more processing stations disposed along the negative Y axis the media card feed direction is reversed (i.e., by reversing the rotation of one or more drive rollers, drive belts, etc.) and the media card 615 is returned to cross feed station 630. As will be apparent to one of ordinary skill in the art in view of the above disclosure, the media card 615 need not move along the positive Y axis before moving along the negative Y axis and may, in fact, move in either the positive or negative Y direction upon being received along the X direction at the cross feed station 630. Further, in another embodiment, the media card 615 need not move along both the positive and negative Y axes before leaving the cross feed station 630 in the X direction. Said differently, one transverse path may be entirely omitted such that the media card 615 moves transversely in only one direction.

In another embodiment, after at least one transverse (e.g., positive Y or negative Y) movement, the cross transport mechanism of the cross feed station 630 feeds the media card along the negative X axis to the first −X station 650. The media card 615 may then be fed downstream along the negative X axis to additional stations, i.e., second −X station, third −X station, etc. (not shown), for subsequent card processing. In alternate embodiments, the depicted second −X station 660 may be omitted such that the media card 615 is fed directly from the first −X station to a printer exit port (not shown). In still other embodiments, the depicted first and second −X stations 650, 660 may be omitted such that the media card 615 is fed directly from the cross feed station 630 to a printer exit port (not shown).

The cross feed architecture described above results in a number of advantages. For example, media processing devices that incorporate such cross feed architectures are capable of increased modularization. For example, by using a cross feed station as framework, printer designers can add printing, encoding, lamination, card cleaning, or other stations along either the X or Y axes in order to meet the particular demands of a given application. Such demands may center on any specific tasks that a printer must perform (i.e., printing, encoding, testing, rejecting, laminating, etc.) and/or the physical workspace available to perform such tasks. Further, although depicted as having only a single cross feed station, media processing devices according to various embodiments of the present invention may include multiple cross feed stations. For example, in one embodiment, two or more cross feed stations may be provided for shuttling printable media along parallel media processing paths. A first path may include printing or image transfer operations while other paths that are separated from the first path by cross feed stations may be dedicated to lamination, encoding, or other media processing operations.

In yet another embodiment, two or more intermediate transfer printing assemblies (e.g., printing assembly 540 of FIG. 9) may be provided adjacent a selected cross feed station to further increase media processing throughput. In such embodiments, a first media card may be loaded and fed to the cross feed station as described above. However, a second media card may be loaded and fed to the cross feed station immediately behind the first media card. In this embodiment, the second media card enters the cross feed station shortly after the first media card has been fed to a first single-pass double-sided image transfer station (or perhaps laminator as suggested below). As the first media card is returned to the cross feed station from the first single-pass double-sided image transfer station (or laminator) the second media card is fed into a second single-pass double-sided image transfer station (or second laminator). As the second media card is returned to the cross feed station from the second single-pass double-sided transfer station (or second laminator) the first media card is fed downstream to other media processing stations. In this regard, cross feed stations according to various embodiments of the present invention are capable of efficiently shuttling printable media between two or more printing assemblies. In alternate embodiments, cross feed stations may be used to shuttle printable media between two or two or more other processing stations such as two or more laminators. Such shuttling may be effective for increasing media processing throughput that is traditionally limited by image transfer speeds, printing speeds, laminating speeds, or any combination thereof. As will be apparent to one of ordinary skill in the art in view of the above disclosure, media processing devices that incorporate cross feed architectures are capable of performing simultaneous printing, image transfer, lamination and other processing operations thereby reducing serial processing inefficiency and potentially doubling printer throughput.

It will be apparent to one of ordinary skill in the art that the cross feed architecture of various embodiments of the present invention need not be limited to operation along the X and Y axes in plane P. Alternatively, in various embodiments the present invention may operate along plane Q defined by the Y and Z axes or alternatively, along plane R defined by the X and Z axes. Further, in still other embodiments, the constituent axes that form the longitudinal and transverse path of the media card need not be perpendicular to one another as shown. Instead, as referenced above, such axes may lie at any angle α between 0 and 180 degrees.

Figure 12:
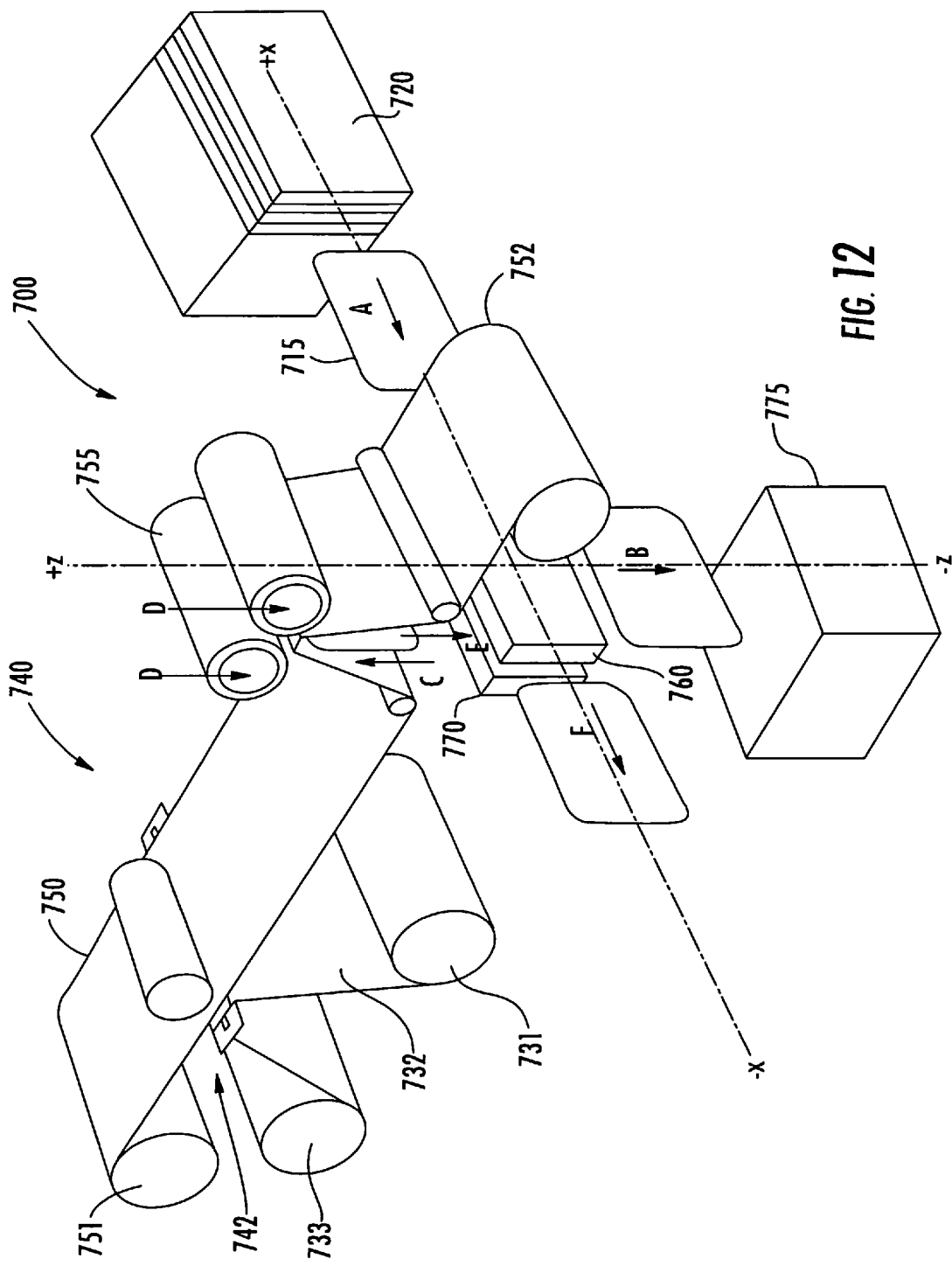
FIG. 12 is a schematic illustration of a printer incorporating a cross feed architecture and a single-pass double-sided image transfer station in accordance with another embodiment of the invention.

FIG. 12 is a schematic illustration of a printer incorporating a cross feed architecture 700 according to another embodiment of the present invention. In the depicted embodiment, media cards 715 are drawn in a SEL orientation from a card feeder station 720. In the depicted embodiment, a media card 715 is transferred from a first load station 720 in the X direction along arrow A to cross feed station 760. Notably, in the depicted embodiment, the media card 715 is oriented in the X-Z plane rather than the X-Y plane orientation described with regard to FIG. 9.

In one embodiment, the media card 715 includes a programmable memory such as a magnetic strip or an RFID chip (not shown). In the depicted embodiment, a programming head 770 is disposed proximate to the cross feed station 760 for reading, writing to, or otherwise programming the programmable memory of the media card 715. Once again, the programming head 770 of the depicted embodiment may be held stationary such that the media card can be efficiently fed along side, thereby avoiding the paused LEL card encoding technique referenced above. In one embodiment, if the programming head 770 fails to successfully encode the media card 715 due to a defective programmable memory within the media card 715, the card 715 is immediately transferred downstream in the Z direction along arrow B to reject hopper station 775. Alternatively, if the programming step is successful the media card 715 is transmitted in the opposite Z direction along arrow C to a single-pass double-sided image transfer station 745. In the depicted embodiment, the media card 715 is maneuvered to the single-pass double-sided image transfer station 745 in a LEL orientation.

In various embodiments of the present invention, the printer includes a printing assembly 740 structured to print indicia to first and second print surfaces of a media card 715 positioned at a single-pass double-sided image transfer station 745. In the depicted embodiment, the printing assembly 740 includes an IT media 750 disposed between an IT media supply roll 751 and an IT media take-up roll 752. The IT media supply roll 751 dispenses (in strip form) the IT media 750 through a print station 742 where print is applied to the IT media 750. In the depicted embodiment, the print station 742 is structured generally similar to the print station described with regard to FIG. 9 above. In other embodiments, however, a variety of additional printing techniques could be employed as long as they are compatible with printing to IT media 750. Further downstream, the IT media 750 extends through a single-pass double-sided image transfer station 745 where portions of the IT media 750 bearing print are transferred to the media card 715.

In the depicted embodiment, the single-pass double-sided image transfer station 745 includes a pair of thermal compression rollers 755 that are heated and urged together to compress the IT media 750 against opposing print surfaces of the media card 715 as described in detail above. In one embodiment, the thermal compression rollers 755 are stationary and, thus, are structured to rotatably engage the media card 715 and IT media 750 as the media card 715 is driven along the Z direction into the nip 756 defined between the thermal compression rollers 755. In another embodiment, the compression rollers 755 are structured to translate linearly in the Z direction along D arrows as shown. As will be apparent to one of ordinary skill in the art, such linear translation allows the thermal compression rollers 755 to roll along the opposed surfaces of the media card 715 once the card has been enclosed by the IT media 750 as shown. In either of the embodiments referenced above, the forces of heat and compression applied to the media card 715 by the thermal compression rollers 755 facilitate transfer of the printed image carried by the IT media 750.

Once a printed image has been imparted to each side of the media card 715, the media card 715 is retracted to the cross feed station 760 along arrow E as shown. In one embodiment, the IT media supply and take-up rollers 715, 752 are reverse biased during the retraction process to ensure that loosely hanging IT media does not disturb the freshly printed media card image. Such reverse-biasing also assists card retraction by applying a tension force T to the trailing edge of the media card as shown. In the depicted embodiment, card retraction is further enhanced by gravity as the media card 715 is pulled downwardly (i.e., in the Z direction along arrow E) as shown.

Following retraction, the media card 715 is positioned in the cross feed position 760 where further card processing operations may occur. For example, in one embodiment, the media card may be embossed by an embossing head (not shown) at the cross feed station immediately following printing. Embossing operations may be particularly appropriate at this stage because media cards often remain warm and, thus, pliable immediately after thermal transfer printing operations. Other card processing operations may be performed at the cross feed station immediately after printing as will be apparent to one of ordinary skill in the art.

In various embodiments, the media card 715 is transmitted from the cross feed station 760 in the X direction along arrow F to subsequent card processing stations (not shown). For example, in one embodiment, the media card 715 is transmitted from the cross feed station 760 in the X direction along arrow F to a media receiving hopper (not shown). In another embodiment, the media card 715 may be transmitted from the cross feed station 760 in the Z direction along arrow B to subsequent card processing stations (not shown). In still another embodiment, the media card 715 may be transmitted from the cross feed station 760 in the Z direction along arrow B to a media receiving hopper (not shown).

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. An image transfer assembly structured to transfer images to a product, the assembly comprising:
   a cross feed station configured to receive a long-edge-leading product along a first receiving axis and a short-edge-leading product along a second receiving axis that is different than the first receiving axis;
   an image transfer station adapted to transfer an image to a product; and
   wherein the product is transmitted between the image transfer station and the cross feed station along a first processing axis and transmitted between the cross feed station and a media processing station along a second processing axis that is different than the first processing axis;
   wherein the first processing axis and the second processing axis are substantially perpendicular.

2. The image transfer assembly of claim 1, further comprising a first load station disposed along the first receiving axis for loading long-edge-leading products and a second load station disposed along the second receiving axis for loading short-edge-leading products.

3. The image transfer assembly of claim 2, wherein at least one of the first load station and the second load station comprise a manual feed card slot.

4. The image transfer assembly of claim 2, further comprising a card feeder disposed proximate at least one of the first load station and the second load station.

5. The image transfer assembly of claim 1, wherein the first receiving axis and the second receiving axis are substantially perpendicular.

6. The image transfer assembly of claim 1, wherein the product is a media card.

7. The image transfer assembly of claim 1, wherein the first receiving axis is substantially co-axial with the first processing axis.

8. The image transfer assembly of claim 1, wherein the second receiving axis is substantially co-axial with the second processing axis.

9. The image transfer assembly of claim 1, wherein the media processing station is an encoding station.

10. The image transfer assembly of claim 9, further comprising a card feeder that is disposed along the second receiving axis.

11. The image transfer assembly of claim 10, wherein the second receiving axis and the second processing axis are substantially co-axial.

12. The image transfer assembly of claim 11, further comprising a manual feed slot that is disposed along the first receiving axis.

13. The image transfer assembly of claim 12, wherein the first receiving axis and the first processing axis are substantially co-axial.

14. The image transfer assembly of claim 13, wherein the first receiving axis and the second receiving axis are substantially perpendicular.

15. The image transfer assembly of claim 1, further comprising a card feeder disposed along the second receiving axis.

16. The image transfer assembly of claim 15, further comprising a manual feed slot disposed along the first receiving axis.

17. The image transfer assembly of claim 16, wherein the first processing axis is substantially co-axial with the first receiving axis.

18. The image transfer assembly of claim 17, wherein the second processing axis is substantially co-axial with the second receiving axis.

19. The image transfer assembly of claim 18, wherein the cross feed station is disposed along the first receiving axis between the image transfer station and the manual feed slot.

20. The image transfer assembly of claim 19, wherein the cross feed station is disposed along the second receiving axis between the card feeder and media processing station.

21. The image transfer assembly of claim 20, wherein the media processing station comprising at least one of a cleaning station, a radio frequency read/write station, a magnetic read/write station, an encoding station, a voiding station, a lamination station, a test station, and a printing station.

22. The image transfer assembly of claim 21, further comprising a second media processing station disposed along the second processing axis, the second media processing station comprising at least one of is at least one of a cleaning station, a radio frequency read/write station, a magnetic read/write station, an encoding station, a voiding station, a lamination station, a test station, and a printing station.

23. The image transfer assembly of claim 1, wherein the media processing station is an encoding station configured to program a memory of the product and wherein the product is received by the image transfer station upon successful programming of the memory by the encoding station.

24. The image transfer assembly of claim 1, wherein the product is transmitted between the image transfer station and the cross-feed station along the first processing axis in a long-edge-leading orientation and transmitted between the cross feed station and a media processing station along the second processing axis in a short-edge-leading orientation.

25. A single-pass double-sided transfer assembly structured to transfer images to a product having opposed image-receptive sides, the single-pass double-sided transfer assembly comprising:
   a cross feed station configured to receive a short-edge-leading product along a first receiving axis and a longedge-leading product along a second receiving axis that is different than the first receiving axis;

an intermediate transfer media structured for receiving a first image and a second image; and a single-pass double-sided transfer station adapted to receive the intermediate transfer media and the product, and transfer the first and second images from the intermediate transfer media to the opposed image-receptive sides of the product substantially simultaneously, wherein the product is transmitted between the single-pass double-sided transfer station and the cross feed station along a first processing axis and is transmitted between the cross feed station and a media processing station along a second processing axis;

wherein the first processing axis and the second processing axis are substantially perpendicular.

26. The single-pass double-sided transfer assembly of claim 25, further comprising a first load station disposed along the first receiving axis for loading long-edge-leading products and a second load station disposed along the second receiving axis for loading short-edge-leading products.

27. The single-pass double-sided transfer assembly of claim 26, wherein at least one of the first load station and the second load station comprise a manual feed card slot.

28. The single-pass double-sided transfer assembly of claim 26, further comprising a card feeder disposed proximate at least one of the first load station and the second load station.

29. The single-pass double-sided transfer assembly of claim 25, wherein the first receiving axis and the second receiving axis are substantially perpendicular.

30. The single-pass double-sided transfer assembly of claim 25, wherein the product is a media card.

31. The single-pass double-sided transfer assembly of claim 25, wherein the first receiving axis is substantially co-axial with the first processing axis.

32. The single-pass double-sided transfer assembly of claim 25, wherein the second receiving axis is substantially co-axial with the second processing axis.

33. The single-pass double-sided transfer assembly of claim 25, wherein the media processing station is an encoding station.

34. The single-pass double-sided transfer assembly of claim 33, further comprising a card feeder that is disposed along the second receiving axis.

35. The single-pass double-sided transfer assembly of claim 34, wherein the second receiving axis and the second processing axis are substantially co-axial.

36. The single-pass double-sided transfer assembly of claim 34, further comprising a manual feed slot that is disposed along the first receiving axis.

37. The single-pass double-sided transfer assembly of claim 36, wherein the first receiving axis and the first processing axis are substantially co-axial.

38. The single-pass double-sided transfer assembly of claim 37, wherein the first receiving axis and the second receiving axis are substantially perpendicular.

39. The single-pass double-sided transfer assembly of claim 25, further comprising a card feeder disposed along the second receiving axis.

40. The single-pass double-sided transfer assembly of claim 39, further comprising a manual feed slot disposed along the first receiving axis.

41. The single-pass double-sided transfer assembly of claim 40, wherein the first processing axis is substantially co-axial with the first receiving axis.

42. The single-pass double-sided transfer assembly of claim 41, wherein the second processing axis is substantially co-axial with the second receiving axis.

43. The single-pass double-sided transfer assembly of claim 42, wherein the cross feed station is disposed along the first receiving axis between the single-pass double-sided transfer station and the manual feed slot.

44. The single-pass double-sided transfer assembly of claim 43, wherein the cross feed station is disposed along the second receiving axis between the card feeder and media processing station.

45. The single-pass double-sided transfer assembly of claim 44, wherein the media processing station comprising at least one of a cleaning station, a radio frequency read/write station, a magnetic read/write station, an encoding station, a voiding station, a lamination station, a test station, and a printing station.

46. The single-pass double-sided transfer assembly of claim 45, further comprising a second media processing station disposed along the second processing axis, the second media processing station comprising at least one of is at least one of a cleaning station, a radio frequency read/write station, a magnetic read/write station, an encoding station, a voiding station, a lamination station, a test station, and a printing station.

47. The single-pass double-sided transfer assembly of claim 25, wherein the media processing station is an encoding station configured to program a memory of the product and wherein the product is received by the image transfer station upon successful programming of the memory by the encoding station.

48. The single-pass double-sided transfer assembly of claim 25, wherein the product is transmitted between single-pass double-sided transfer station and the cross-feed station along the first processing axis in a long-edge-leading orientation and transmitted between the cross feed station and a media processing station along the second processing axis in a short-edge-leading orientation.

* * * * *

UNITED STATES PATENT AND TRADEMARK OFFICE
CERTIFICATE OF CORRECTION

| | | |
|---|---|---|
| PATENT NO. | : 7,870,824 B2 | Page 1 of 1 |
| APPLICATION NO. | : 11/406548 | |
| DATED | : January 18, 2011 | |
| INVENTOR(S) | : Helma et al. | |

It is certified that error appears in the above-identified patent and that said Letters Patent is hereby corrected as shown below:

<u>Column 12,</u>

Lines 36 and 39, "comers", each occurrence, should read --corners--.

<u>Column 15,</u>

Line 51, "1000A" should read --1010A--.

Signed and Sealed this
Twenty-fourth Day of January, 2012

David J. Kappos
*Director of the United States Patent and Trademark Office*